US010556242B2

(12) United States Patent
Jeon et al.

(10) Patent No.: US 10,556,242 B2
(45) Date of Patent: Feb. 11, 2020

(54) ELECTRIC DUST COLLECTOR AND METHOD OF MANUFACTURING THE SAME

(71) Applicant: LG ELECTRONICS INC., Seoul (KR)

(72) Inventors: Hooncheol Jeon, Seoul (KR); Taeyoon Kim, Seoul (KR); Yanghwa Lee, Seoul (KR); Woongi Kil, Seoul (KR); Hyungho Park, Seoul (KR); Inho Choi, Seoul (KR); Jieun Choi, Seoul (KR); Kunyoung Lee, Seoul (KR); Sanghyuk Son, Seoul (KR); Jongsu Lee, Seoul (KR); Kyoungho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 348 days.

(21) Appl. No.: 15/338,267

(22) Filed: Oct. 28, 2016

(65) Prior Publication Data

US 2017/0120256 A1 May 4, 2017

Related U.S. Application Data

(60) Provisional application No. 62/355,118, filed on Jun. 27, 2016, provisional application No. 62/252,017, (Continued)

(30) Foreign Application Priority Data

Nov. 7, 2015 (KR) ........................ 10-2015-0156254
Dec. 24, 2015 (KR) ........................ 10-2015-0185846
(Continued)

(51) Int. Cl.
*F24F 6/04* (2006.01)
*F24F 13/20* (2006.01)
(Continued)

(52) U.S. Cl.
CPC .................. *B03C 3/82* (2013.01); *B03C 3/02* (2013.01); *B03C 3/41* (2013.01); *B03C 3/45* (2013.01)

(58) Field of Classification Search
CPC combination set(s) only.
See application file for complete search history.

(56) References Cited

U.S. PATENT DOCUMENTS 2,364,641 A * 12/1944 Meston .................... B03C 3/41 417/49
2,873,000 A 2/1959 Elam
(Continued)

FOREIGN PATENT DOCUMENTS

CN 101745462 A 6/2010
CN 101884953 A 11/2010
(Continued)

*Primary Examiner* — Amber R Orlando
*Assistant Examiner* — Sonji Turner
(74) *Attorney, Agent, or Firm* — Dentons US LLP

(57) ABSTRACT

An electric dust collector is disclosed. The electric dust collector includes a film for collecting electrified dust particles and a case for receiving the film. A conductor-receiving part defining an insertion space, into which a portion of the film is inserted, is provided in the case. The electric dust collector further includes an electrode connection part filling the insertion space in the state of being in contact with the film. The electrode connection part is electrically connected to a voltage source to apply voltage in order to the film.

16 Claims, 27 Drawing Sheets

Related U.S. Application Data filed on Nov. 6, 2015, provisional application No. 62/248,463, filed on Oct. 30, 2015.

(30) Foreign Application Priority Data

Mar. 28, 2016 (KR) ........................ 10-2016-0037235
Mar. 28, 2016 (KR) ........................ 10-2016-0037246

(51) Int. Cl.

| | |
|---|---|
| ***F24F 13/28*** | (2006.01) |
| ***B01D 46/10*** | (2006.01) |
| ***B03C 3/82*** | (2006.01) |
| ***B03C 3/02*** | (2006.01) |
| ***B03C 3/41*** | (2006.01) |
| ***B03C 3/45*** | (2006.01) |

(56) References Cited

U.S. PATENT DOCUMENTS

| | | | | | |
|---|---|---|---|---|---|
| 3,665,679 | A * | 5/1972 | McLain | B03C 3/47 55/481 |
| 3,685,258 | A * | 8/1972 | Kostel | B03C 3/32 55/467 |
| 8,349,052 | B2 * | 1/2013 | Noh | B03C 3/08 95/79 |
| 8,512,455 | B2 * | 8/2013 | Yasuhiko | B03C 3/86 96/69 |
| 8,690,996 | B2 * | 4/2014 | Ji | C25B 11/02 95/79 |
| 9,795,971 | B2 * | 10/2017 | Shao | B03C 3/64 |

FOREIGN PATENT DOCUMENTS

| | | | | |
|---|---|---|---|---|
| CN | 202460831 | U | | 10/2012 |
| CN | 104575686 | A | | 4/2015 |
| EP | 2 532 434 | A2 | | 12/2012 |
| FR | 2 893 864 | A1 | | 6/2007 |
| JP | 2009-95799 | A | | 5/2009 |
| JP | 2009095799 | A | * | 5/2009 |
| JP | 2010-131505 | A | | 6/2010 |
| KR | 20-1998-0058754 | U | | 10/1998 |
| KR | 10-2008-0055013 | A | | 6/2008 |
| KR | 10-2011-0088742 | A | | 8/2011 |
| KR | 10-2011-0088744 | A | | 8/2011 |
| KR | 10-2012-0136795 | A | | 12/2012 |

* cited by examiner

ELECTRIC DUST COLLECTOR AND METHOD OF MANUFACTURING THE SAME

CROSS-REFERENCE TO RELATED APPLICATIONS

This U.S. non-provisional patent application claims priority under 35 U.S.C. § 119 of U.S. Provisional Application No. 62/248,463, filed on Oct. 30, 2015, U.S. Provisional Application No. 62/252,017, filed on Nov. 6, 2015, Korean Patent Application No. 10-2015-0156254, filed on Nov. 7, 2015, Korean Patent Application No. 10-2015-0185846, filed on Dec. 24, 2015, Korean Patent Application No. 10-2016-0037235, filed on Mar. 28, 2016, Korean Patent Application No. 10-2016-0037246, filed on Mar. 28, 2016, U.S. Provisional Application No. 62/355,118, filed on Jun. 27, 2016, Korean Patent Application No. 10-2016-0083227, filed on Jul. 1, 2016, and Korean Patent Application No. 10-2016-0121745 filed on Sep. 22, 2016, the entire contents of which are hereby incorporated by reference.

BACKGROUND OF THE INVENTION

1. Field of the Invention

The present invention relates to an electric dust collector for generating an electric field to collect electrified dust particles and a method of manufacturing the same.

2. Description of the Related Art

An air conditioner refers any of a cooler or a heater for controlling the temperature of air, an air freshener for removing foreign matter from air to maintain cleanliness of the air, a humidifier for supplying moisture to air, and/or a dehumidifier for removing moisture from air.

An electric dust collector is a stand-alone device or a device mounted in an air conditioner for electrifying and collecting dust particles in the air.

The electric dust collector generally includes an electrification unit for generating an electric field and a dust collection unit for collecting dust particles electrified by the electrification unit. While air passes through the dust collection unit after passing through the electrification unit, dust in the air is collected by the dust collection unit.

The electrification unit includes discharge films and opposite films arranged parallel to the discharge films. Dust is electrified as the result of corona discharge between the discharge films and the opposite films.

For example, Korean Patent Application Publication No. 10-2011-0088742 (published on Aug. 4, 2011) discloses a dust collection unit including film type first films and film type second films. Each first film is formed by applying insulative layers to opposite surfaces of an electrically conductive layer, and each second film is formed of a metal film sheet.

A plurality of film support parts are disposed at opposite sides of the first films and the second films, and protrusions are formed at the film support parts. The protrusions are inserted into gaps between the first films and the second films.

A film connection structure for applying high potential to each first film contacts a conductive layer exposed at one end of the first film, and a film connection structure for grounding each second film contacts the other end of the second film.

SUMMARY OF THE INVENTION

In the conventional art, the film connection structure contacts each first film and each second film, with the result that it is necessary to carefully perform the process. In addition, resistance is increased depending on the extent to which the film connection structure contacts each first film and each second film. Furthermore, sparks may occur when a voltage higher than a predetermined voltage is applied. It is an object of the present invention to solve this problem.

In the conventional art, the film connection structures or the exposed parts of the conductive layers of the first films may be wet after the electric dust collector is washed using water. When the electric dust collector is powered on in this state, a user may receive an electric shock, or the electric dust collector may be short-circuited. It is an object of the present invention to solve this problem.

In the conventional art, it is necessary to pay careful attention to the assembly of various engagement structures in order to maintain the distances between the respective films (e.g., the first films and the second films) and to attach the respective films (e.g., the first films and the second films). It is an object of the present invention to solve this problem.

In accordance with one aspect of the present invention, an electric dust collector includes a film to collect electrified dust particles and a case receiving the film. A conductor-receiving part defining an insertion space, into which a portion of the film is inserted, is provided in the case. The electric dust collector further includes an electrode connection part filling the insertion space in the state of being in contact with the film. The electrode connection part is electrically connected to a voltage source so as to apply voltage to the film.

The electrode connection part may be formed by hardening conductive paste. Alternatively, the electrode connection part may be formed by combining conductive powder.

The conductive powder may include conductive coating powder obtained by coating powder having relatively low electrical conductivity with a metal having relatively high electrical conductivity.

The film may include a plurality of films arranged to face each other such that gaps are formed between the respective films, and the electric dust collector may further include a gap maintenance part having vertical bars inserted into the gaps to maintain the gaps.

The film may include a conductive layer, to which voltage is applied, and an insulative layer covering the conductive layer. A portion of the conductive layer may be exposed to form an exposed part. At least a portion of the exposed part may be inserted into the insertion space to contact the electrode connection part.

The electric dust collector may further include an electrically insulative cover part covering the electrode connection part.

The electric dust collector may further include a molding-receiving part formed in the case, the molding-receiving part defining a molding space filled with the cover part.

The conductor-receiving part and the exposed part may be disposed in the molding space.

The film may be provided with a catching recess, and the molding-receiving part may include a holding rib inserted into the catching recess to position the film.

The film may be provided with a catching recess, and the conductor-receiving part may include a holding rib inserted into the catching recess to position the film.

The electric dust collector may further include a metal member covered by the electrode connection part in the state of being in contact with the electrode connection part, a conducting wire electrically connected to the voltage source being attached to the metal member.

Catching recesses are formed at opposite ends of each of the films in the longitudinal direction. The electric dust collector may further include a first holding rib inserted into the catching recess formed at one end of each of the films and a second holding rib inserted into the catching recess formed at the other end of each of the films.

The electrode connection part may electrically interconnect the films.

The film may include a plurality of first films, to which relatively high potential is applied, and a plurality of second films, to which relatively low potential is applied.

The electrode connection part may include a first electrode connection part to electrically interconnect the first films and a second electrode connection part to electrically interconnect the second films.

The conductor-receiving part may include a first conductor-receiving part defining a space filled with the first electrode connection part and a second conductor-receiving part defining a space filled with the second electrode connection part.

In accordance with one aspect of the present invention, an electric dust collector includes a plurality of films to collect electrified dust particles, a case receiving the films, and an electrode connection part to electrically interconnect the films. And, a conductor-receiving part defining an insertion space, into which a portion of each of the films is inserted, is provided in the case, the insertion space being filled with the electrode connection part.

In accordance with another aspect of the present invention, a method of manufacturing the electric dust collector according to the present invention includes disposing the film at a predetermined position, injecting the conductive paste such that a portion of the film is immersed in the conductive paste, and hardening the injected conductive paste.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
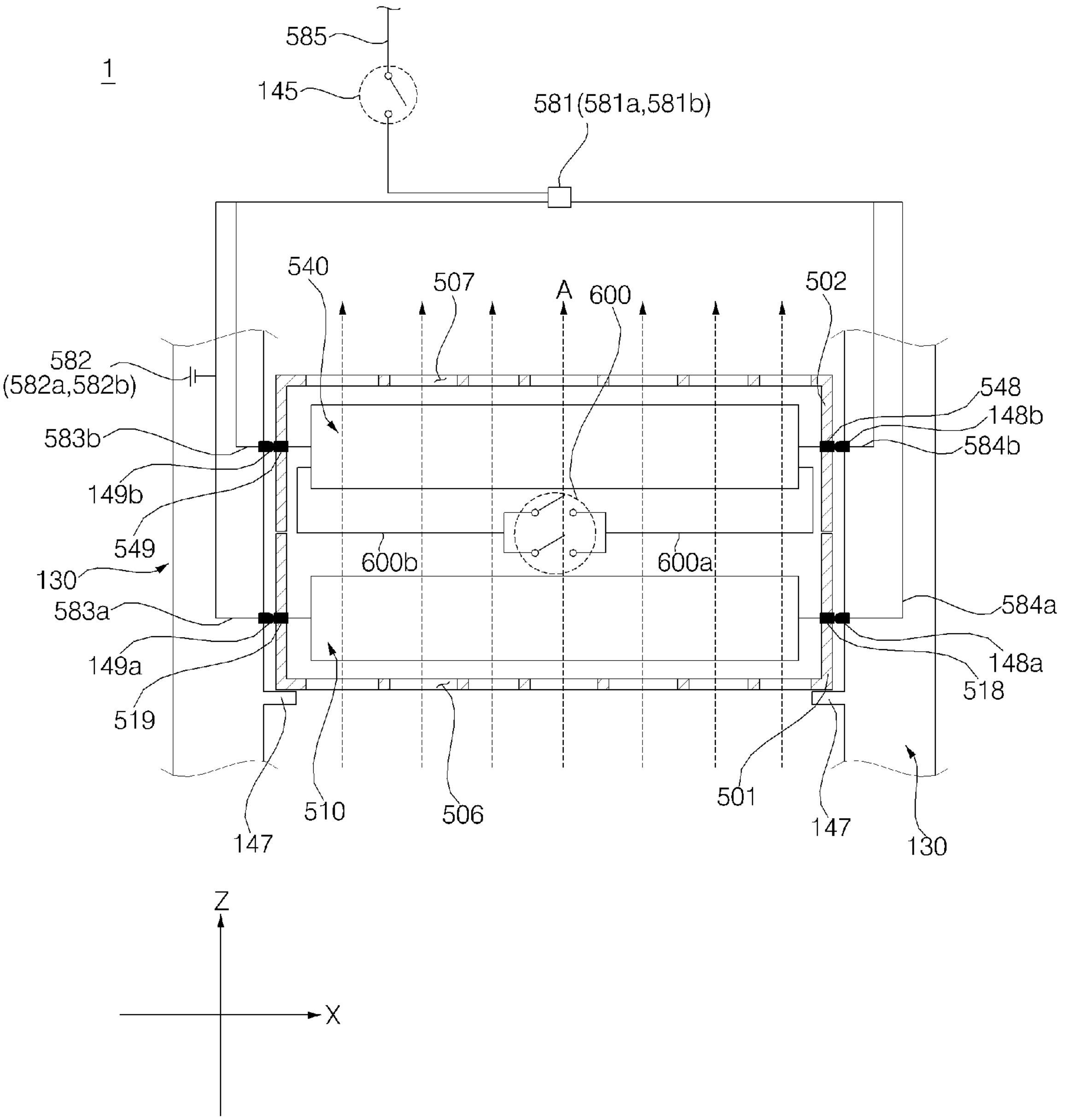
FIG. 1 is a sectional conceptual view showing an electric dust collector according to an embodiment of the present invention.

Exemplary embodiments of the present invention will be described with reference to the attached drawings.

In the drawings, the X-axis direction means the direction in which films of a dust collection unit, a description of which will follow, are alternately arranged, the Y-axis direction means the longitudinal direction of the films, and the Z-axis direction means the lateral direction of the films. In this embodiment, the X-axis direction, the Y-axis direction, and the Z-axis direction are perpendicular to each other. In this embodiment, the Z-axis direction is the upward-downward direction (specifically, the Z-axis direction indicated by the forward direction of the arrow is the upward direction and the Z-axis direction indicated by the reverse direction of the arrow is the downward direction). However, the present invention is not limited thereto.

In the following description, the term "potential" means electrical potential energy. In the following description, the term "voltage" means the potential difference between two points. In the following description, the term "electrical connection" includes connection between two members via another conductor as well as direct contact between the two members. In the following description, the terms "first," "second," etc. are used only to avoid confusion between components, and do not indicate the sequence or importance of the components.

An electric dust collector according to the present invention may be used as a component of an air conditioner or a vacuum cleaner that is capable of cooling, heating, freshening, or humidifying a room or as a stand-alone device.

In addition, the electric dust collector according to the present invention may have an integrated structure or a separable structure for easy cleaning. In the specification, an electric dust collector is described as being configured to have a structure in which a case, in which a dust collection unit is received, can be withdrawn from a body. However, the present invention is not limited thereto.

Hereinafter, a detachable electric dust collector 1 according to an embodiment of the present invention will be described with reference to FIG. 1.

The electric dust collector 1 includes an electrification unit 510 for electrifying dust particles in the air, a dust collection unit 540 for collecting the dust particles electrified by the electrification unit 510, and a case 501 and 502 for receiving the electrification unit 510 and the dust collection unit 540. The case 501 and 502 may define the external appearance of the electric dust collector 1. The electrification unit 510 may be disposed at the lower side, and the dust collection unit 540 may be disposed at the upper side.

The electric dust collector 1 may include a body 130 for supporting the case 501 and 502. The body 130 may be provided at one side thereof with a case insertion opening (not shown). The body 130 may have an inner space for receiving the case 501 and 502. The case 501 and 502 may be inserted into the inner space of the body 130 through the case insertion opening.

The case 501 and 502 is supported by the body 130. The case 501 and 502 may be separably located inside the body 130. The case 501 and 502 may be inserted into the body 130, and may be withdrawn from the body 130.

The body 130 may include a case guide 147 for guiding the location of the case 501 and 502 in the body 130. The body 130 may include a case guide 147 for guiding the withdrawal and introduction of the case 501 and 502 from and into the body 130. The case guide 147 may be disposed at each side of the case 501 and 502. The case guide 147 may be provided in the inner space of the body 130.

The case 501 and 502 may include an electrification unit case 501 for defining a space in which the electrification unit 510 is received and a dust collection unit case 502 for defining a space in which the dust collection unit 540 is received. The electrification unit case 501 may be disposed at the lower side thereof, and the dust collection unit case 502 may be disposed at the upper side thereof. The case 501 and 502 is formed such that the space for receiving the electrification unit 510 and the space for receiving the dust collection unit 540 communicate with each other.

In this embodiment, the electrification unit case 501 is disposed at the lower side thereof, and the dust collection unit case 502 is disposed at the upper side thereof. In addition, the electrification unit 510 is disposed at the lower side of the electrification unit 510, and the dust collection unit 540 is disposed at the upper side thereof. However, the present invention is not limited thereto.

The case 501 and 502 has an inlet port 506, through which air containing dust particles is introduced, and an outlet port 507, through which air in the case 501 and 502 is discharged to the outside. The case 501 and 502 may have a plurality of inlet ports 506. The case 501 and 502 may have a plurality of outlet ports 507. In this embodiment, the inlet port 506 is formed in the lower surface of the electrification unit case 501, and the outlet port 507 is formed in the upper surface of the dust collection unit case 502.

In this embodiment, the case 501 and 502 may be supported by the body 130 in the state in which the lower surface of the case 501 and 502 is spaced apart from the floor. In other embodiments, the case 501 and 502 may be provided with a case support member (not shown) for supporting the case 501 and 502 in the state in which the case 501 and 502 is spaced apart from the floor. The case support member may protrude in the downward direction of the case 501 and 502 so as to contact the floor.

In this embodiment, air flows in the direction denoted by reference symbol A. That is, air flows in the upward direction. Air is introduced into the case 501 and 502 through the inlet port 506. The air, introduced into the case 501 and 502 through the inlet port 506, sequentially passes through the electrification unit 510 and the dust collection unit 540, and is discharged to the outside through the outlet port 507. In other embodiments, air may flow in the downward direction, in the lateral direction, or in the diagonal direction. In other embodiments, the electrification unit 510 and the dust collection unit 540 may be disposed in the reverse arrangement. The electrification unit 510 and the dust collection unit 540 may be arranged horizontally. In this case, settings are performed such that air flows from the electrification unit 510 to the dust collection unit 540.

The electrification unit 510 according to this embodiment will be described with reference to FIGS. 2(*a*) and 3.

The electrification unit 510 includes a wire discharge film 521, to which high voltage is applied, and an opposite film plate 523 spaced apart from the wire discharge film 521. High voltage is applied to the wire discharge film 521 such that discharge can occur between the wire discharge film 521 and the opposite film plate 523.

A plurality of opposite film plates 523 may be disposed. The opposite film plates 523 may be spaced apart from each other so as to face each other in the state in which the wire discharge film 521 is disposed between the respective opposite film plates 523.

A plurality of wire discharge films 521 may be disposed. The wire discharge films 521 may be spaced apart from each other so as to be parallel to each other. The opposite film plates 523 may be disposed between the respective wire discharge films 521 in the direction perpendicular to the direction in which the wire discharge films 521 are arranged.

Figure 2A:
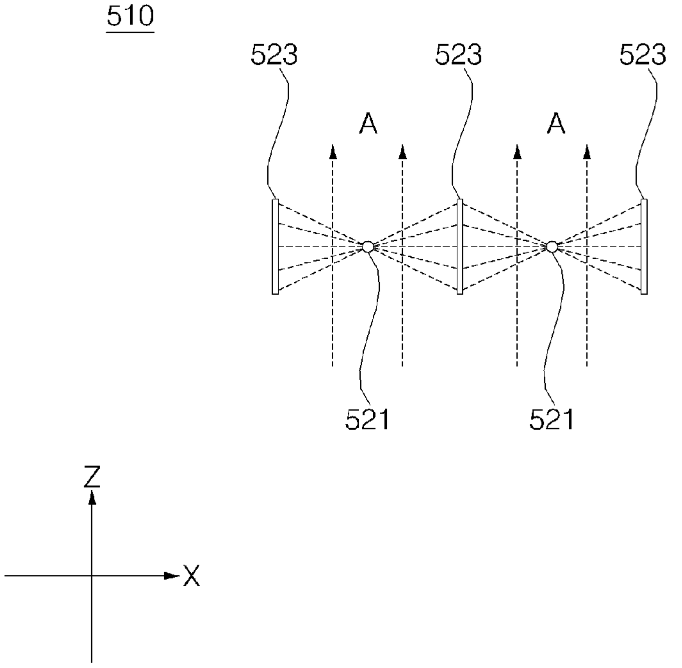
FIG. 2(*a*) is a conceptual view showing the discharge structure of an electrification unit shown in FIG. 1, wherein FIG. 2(*a*) is a view showing an electrification unit according to this embodiment and FIG. 2(*b*) is a view showing an electrification unit according to another embodiment.
Figure 2B:
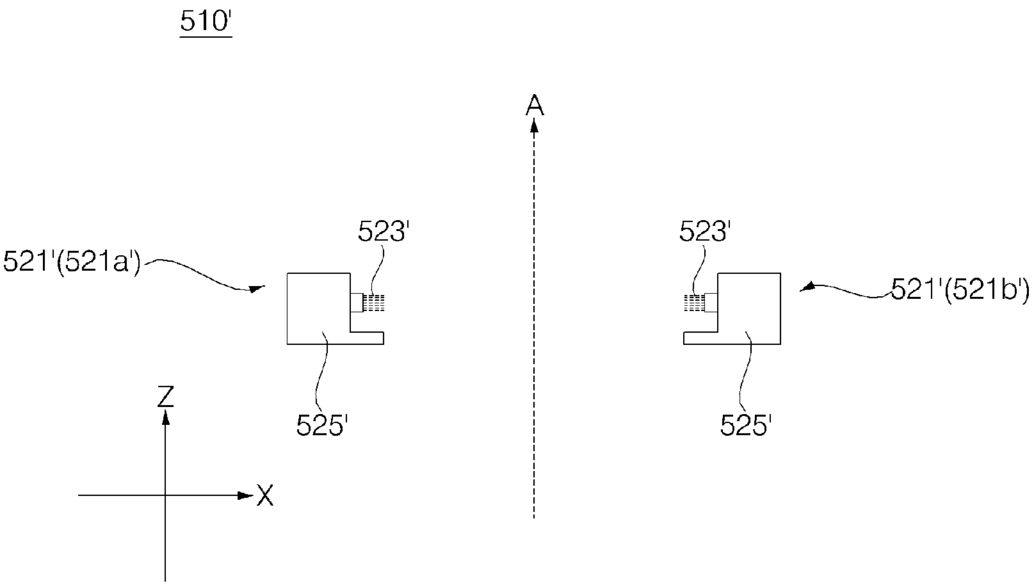

FIGS. 2(*a*) and 3 exemplarily show several wire discharge films 521 and several opposite film plates 523 alternately arranged while being spaced apart from each other in the direction X, which is perpendicular to the flow direction A of air. Alternatively, a larger number of wire discharge films 521 and opposite film plates 523 may be alternately arranged.

The wire discharge films 521 and the opposite film plates 523 may be attached to the electrification unit case 501. A distance-maintaining structure (not shown) for maintaining the distances between the wire discharge films 521 and the opposite film plates 523 may be provided.

When voltage is applied to the wire discharge films 521, corona discharge occurs between the wire discharge films 521 and the opposite film plates 523. Dust particles in the air are electrified while the air passes through the electrification unit 510.

An electrification unit 510' according to another embodiment will be described with reference to FIG. 2(*b*). The electrification unit 510' includes at least one ion generator 521' for generating ions. A plurality of ion generators 521' may be arranged at intervals in the direction X, which is perpendicular to the direction A in which air flows. The ion generators 521' may electrify dust particles in the air.

Each ion generator 521' includes a carbon fiber film 523' for performing corona discharge. The carbon fiber film 523' may be formed in the shape of a brush. The carbon fiber film 523' may be formed by binding a plurality of micro carbon fibers into a brush bundle. The carbon fiber film 523' may extend in the direction X, which is perpendicular to the direction A in which air flows.

Referring to FIG. 2(*b*), two ion generators 521*a*' and 521*b*' are arranged so as to be spaced apart from each other in the direction X, which is perpendicular to the direction A in which air flows. Carbon fiber films 523' protrude from the respective ion generators 521*a*' and 521*b*' so as to face each other.

When high voltage is applied to each carbon fiber film 523', the carbon fiber film 523' may be discharged to ionize molecules in the air. As a result, negative ions, such as $OH^-$ or $O^-$, or positive ions, such as $H^+$, may be generated. The ions generated by the carbon fiber film 523' electrify dust particles in the air. The negative ions may provide electrons to the dust particles such that the dust particles are electrified and act as a negative film. The positive ions may remove electrons from the dust particles such that the dust particles are electrified and act as a positive film.

Each ion generator 521' includes a film housing 525' for protecting a corresponding carbon fiber film 523'. The film housing 525' may be mounted in the electrification unit case 501. A printed circuit board (PCB) (not shown), to which the carbon fiber film 523' is connected, may be installed in the film housing 525'. The carbon fiber film 523' may be connected to the PCB via an additional wire. Alternatively, the carbon fiber film 523' may be directly connected to the PCB.

Referring to FIGS. 4 to 7, the dust collection unit 540 includes a film 540*a* for collecting the electrified dust particles. The dust collection unit 540 includes a plurality of films 540*a* for generating an electric field to collect the electrified dust particles.

In this embodiment, the films 540*a* may be formed by covering conductive layers 551*a* and 551*b* with insulative layers 552*a* and 552*b*, respectively. In other embodiments, conductive layers 551*a* may be formed on the surfaces of each film 540*a*. In particular, conductive layers 551*a* may be formed on the surfaces of each second film 542, to which low potential is applied.

The films 540*a* include a first film 541, to which relatively high potential is applied, and a second film 542, to which relatively low potential is applied.

A plurality of first films 541 may be provided. A plurality of second films 542 may be provided. The films 541 and 542 may be formed by applying insulative layers 552*a* and 552*b* to opposite surfaces of conductive layers 551*a* and 551*b*, respectively.

Each first film 541 may be formed by covering a conductive layer 551*a*, to which relatively high potential is applied, with insulative layers 552*a*. Each second film 542 may be formed by covering a conductive layer 551*b*, to which relatively low potential is applied, with insulative layers 552*b*.

The dust collection unit 540 includes a fixing part 540*b* for attaching the first films 541 and the second films 542 in the case 501 and 502. The fixing part 540*b* may attach the films 540*a* in the dust collection unit case 502.

The first films 541 and the second films 542 are alternately arranged. The first films 541 and the second films 542 are arranged such that the lateral direction Z of the films is the vertical direction. However, the present invention is not limited thereto. The first films 541 and the second films 542 may be arranged side by side so as to be aligned in the longitudinal direction Y.

The films 540*a* are arranged so as to face each other in the state in which gaps S are formed between the respective films. The first films 541 and the second films 542 are alternately arranged in the direction X, which is perpendicular to the lateral direction Z and the longitudinal direction Y in the state in which gaps S are formed between the respective films. Each of the films 540*a* is formed in the shape of a band that is longer in the longitudinal direction Y than in the lateral direction Z. The films 540*a* are arranged side by side so as to face each other in the state in which gaps S are formed between the respective films to constitute a film group.

Figure 3:
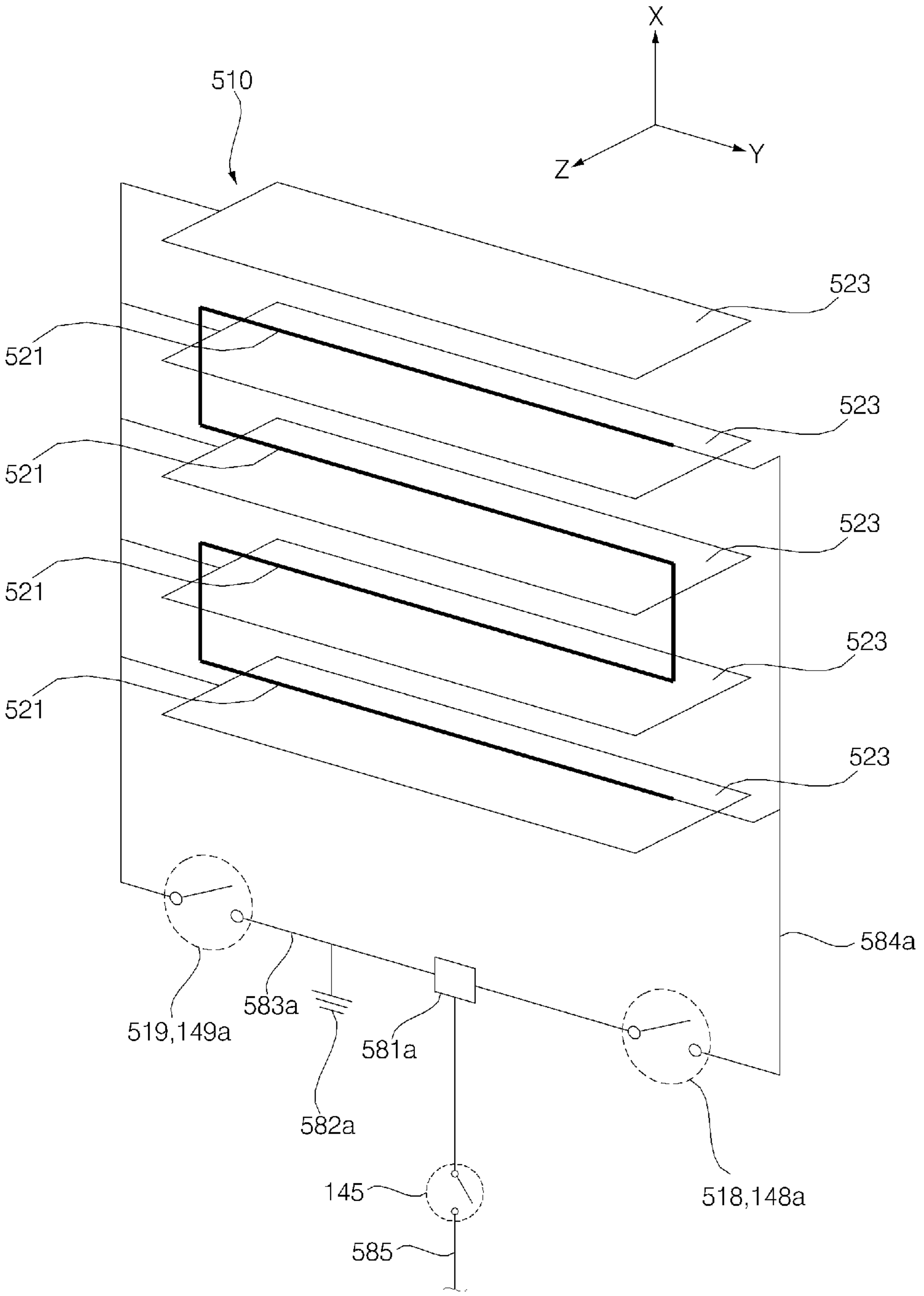
FIG. 3 is a perspective view conceptually showing a circuit of the electrification unit shown in FIG. 1.
Figure 4:
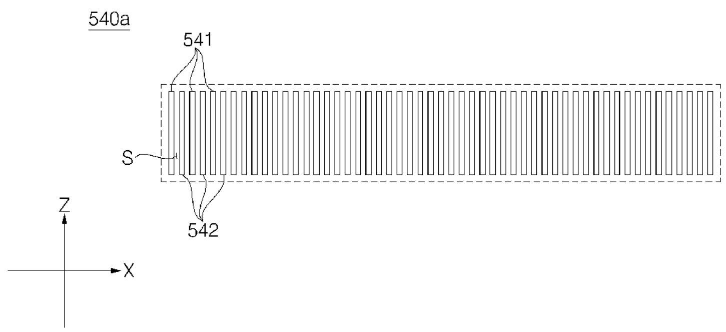
FIG. 4 is a sectional conceptual view showing an arrangement structure of films of a dust collection unit shown in FIG. 1.
Figure 5:
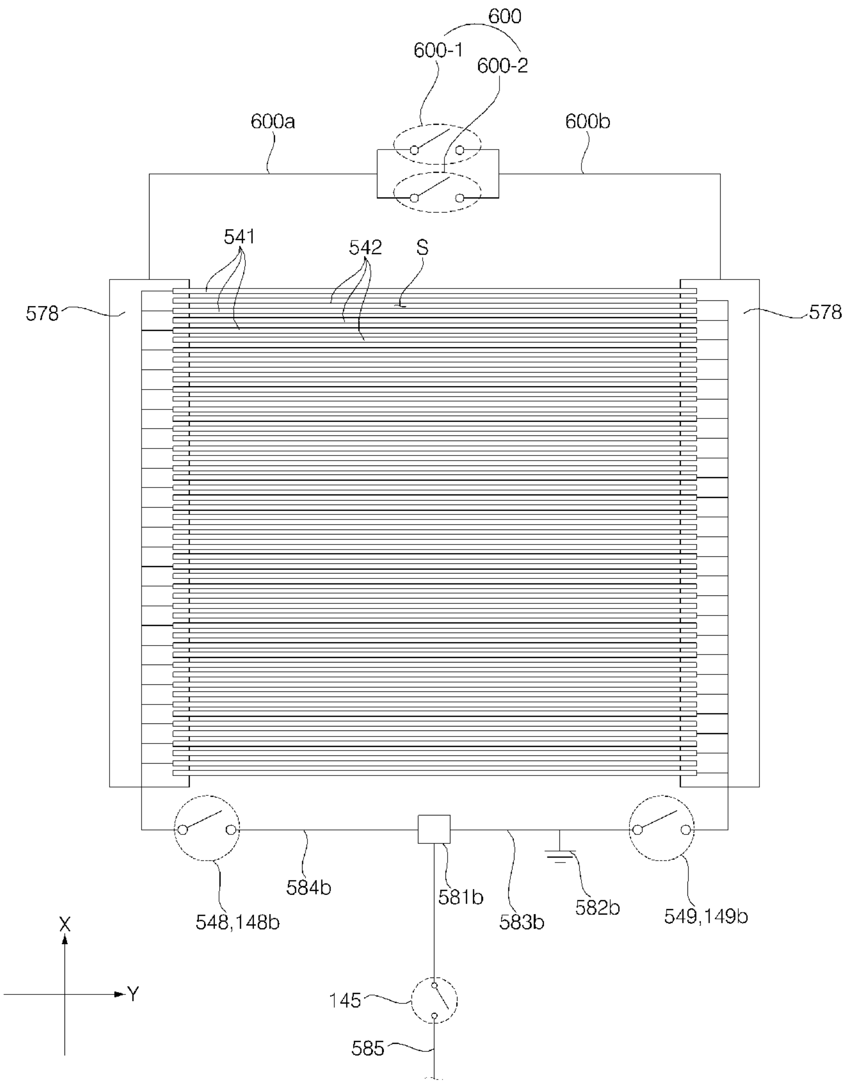
FIG. 5 is an elevation view conceptually showing a circuit of the dust collection unit shown in FIG. 1.

Hereinafter, the circuit of the electric dust collector 1 will be described with reference to FIGS. 1, 3, and 5.

The body 130 includes power terminals 148*a* and 148*b* for respectively supplying power to the electrification unit 510 and the dust collection unit 540. The body 130 includes ground terminals 149*a* and 149*b* for respectively grounding the electrification unit 510 and the dust collection unit 540. An electrification unit power terminal 148*a* for supplying power to the electrification unit 510 and a dust collection unit power terminal 148*b* for supplying power to the dust collection unit 540 may be separately provided. An electrification unit ground terminal 149*a* for grounding the electrification unit 510 and a dust collection unit ground terminal 149*b* for grounding the dust collection unit 540 may be separately provided.

The body 130 includes a high-voltage generator 581 for generating high voltage. The body includes a high-voltage generator 581*a* for generating high voltage to be applied to the electrification unit 510. The body includes a high-voltage generator 581*b* for generating high voltage to be applied to the dust collection unit 540. The high-voltage generator 581*b* generates the potential difference between the first conductive layers 551*a* and the second conductive layers 551*b*.

In this embodiment, the high-voltage generator 581*a* and the high-voltage generator 581*b* constitute a single high-voltage generator 581. Power from the high-voltage generator 581 is applied to the electrification unit 510 and the dust collection unit 540 in parallel. The body 130 includes a power supply wire 585 for supplying power to the high-voltage generator 581.

The electric dust collector 1 includes power-receiving terminals 518 and 548 and ground-receiving terminals 519 and 549 that respectively contact the power terminals 148*a* and 148*b* and the ground terminals 149*a* and 149*b*.

The power terminals 148*a* and 148*b*, which are connected to the high-voltage generator 581 to respectively supply power to the electrification unit 510 and the dust collection unit 540, are disposed at the body 130. The ground terminals 149*a* and 149*b*, which are connected to a ground 582 to respectively ground the electrification unit 510 and the dust collection unit 540, are disposed at the body 130.

The power terminals 148*a* and 148*b* include an electrification unit power terminal 148*a* and a dust collection unit power terminal 148*b*. The ground terminals 149*a* and 149*b* include an electrification unit ground terminal 149*a* and a dust collection unit ground terminal 149*b*.

The electrification unit power terminal 148*a*, which is connected to the high-voltage generator 581*a* to supply power to the electrification unit 510, is disposed at the body 130. The dust collection unit power terminal 148*b*, which is connected to the high-voltage generator 581*b* to supply power to the dust collection unit 540, is disposed at the body 130. The electrification unit ground terminal 149*a*, which is connected to a ground 582*a* to ground the electrification unit 510, is disposed at the body 130. The dust collection unit ground terminal 149*b*, which is connected to a ground 582*b* to ground the dust collection unit 540, is disposed at the body 130.

The power-receiving terminals 518 and 548, which respectively contact the power terminals 148*a* and 148*b* to supply power to the electrification unit 510 and the dust collection unit 540, are disposed on the outer surface of the case 501 and 502. The ground-receiving terminals 519 and 549, which respectively contact the ground terminals 149*a* and 149*b* so as to ground the electrification unit 510 and the dust collection unit 540, are disposed on the outer surface of the case 501 and 502.

The power-receiving terminals 518 and 548 include an electrification unit power-receiving terminal 518 and a dust collection unit power-receiving terminal 548. The ground-receiving terminals 519 and 549 include an electrification unit ground-receiving terminal 519 and a dust collection unit ground-receiving terminal 549.

The electrification unit power-receiving terminal 518, which contacts the electrification unit power terminal 148*a* to supply power to the electrification unit 510, is disposed at the outer surface of the case 501 and 502. The dust collection unit power-receiving terminal 548, which contacts the dust collection unit power terminal 148*b* to supply power to the dust collection unit 540, is disposed at the outer surface of the case 501 and 502. The electrification unit ground-receiving terminal 519, which contacts the electrification unit ground terminal 149*a* to ground the electrification unit 510, is disposed at the outer surface of the case 501 and 502. The dust collection unit ground-receiving terminal 549, which contacts the dust collection unit ground terminal 149*b* to ground the dust collection unit 540, is disposed at the outer surface of the case 501 and 502.

The electrification unit power-receiving terminal 518 and the dust collection unit power-receiving terminal 548 may be disposed in the same horizontal plane so as to be spaced apart from each other diagonally. The electrification unit ground-receiving terminal 519 and the dust collection unit ground-receiving terminal 549 may be disposed in the same horizontal plane so as to be spaced apart from each other diagonally.

The case 501 and 502 may be introduced or inserted into the body 130. The case 501 and 502 may be withdrawn from the body 130. When the case 501 and 502 is introduced or inserted into the body 130, the power terminals 148*a* and 148*b* respectively contact the power-receiving terminals 518 and 548, and the ground terminals 149*a* and 149*b* respectively contact the ground-receiving terminals 519 and 549. Only in the state in which the case 501 and 502 is settled in the body 130, the power terminals 148*a* and 148*b* respectively contact the power-receiving terminals 518 and 548, and the ground terminals 149*a* and 149*b* respectively contact the ground-receiving terminals 519 and 549. The state in which the case 501 and 502 is settled in the body 130 means the state in which the case 501 and 502 is fully introduced or fully inserted into the body 130. That is, when the case 501 and 502 is not fully introduced or not fully inserted into the body 130 or the case 501 and 502 is withdrawn from the body 130, the case 501 and 502 is not settled in the body 130.

The electrification unit ground-receiving terminal 519 and the dust collection unit ground-receiving terminal 549 are respectively provided at points on the outer surface of the case 501 and 502 that correspond to the electrification unit ground terminal 149*a* and the dust collection unit ground terminal 149*b*.

On the outer surface of the case 501 and 502, the electrification unit power-receiving terminal 518 and the dust collection unit power-receiving terminal 548 may be opposite the electrification unit ground-receiving terminal 519 and a dust collection unit ground-receiving terminal 549. The power-receiving terminals 518 and 548 and the ground-receiving terminals 519 and 549 may be respectively disposed at the left and right side surfaces of the case 501 and 502. The electrification unit power-receiving terminal 518 and the dust collection unit power-receiving terminal 548 may be disposed at the same side surface of the case 501 and 502. The electrification unit ground-receiving terminal 519 and the dust collection unit ground-receiving terminal 549 may be disposed at the same side surface of the case 501 and 502.

Specifically, the power-receiving terminals 518 and 548 and the ground-receiving terminals 519 and 549 are disposed such that the power terminals 148*a* and 148*b* respectively contact the power-receiving terminals 518 and 548 and such that the ground terminals 149*a* and 149*b* respectively contact the ground-receiving terminals 519 and 549 only in the state in which the case 501 and 502 is settled in the body 130.

The electrification unit power terminal 148*a* and the dust collection unit power terminal 148*b* may be disposed on the same side of the inner surface of the body 130. The electrification unit ground terminal 149*a* and the dust collection unit ground terminal 149*b* may be disposed on the same side of the inner surface of the body 130.

In the state in which the case 501 and 502 is settled in the body 130, the electrification unit power terminal 148*a* contacts the electrification unit power-receiving terminal 518, and the electrification unit ground terminal 149*a* contacts the electrification unit ground-receiving terminal 519. As a result, high voltage is applied to the electrification unit 510.

In the state in which the case 501 and 502 is settled in the body 130, the dust collection unit power terminal 148*b* contacts the dust collection unit power-receiving terminal 548, and the dust collection unit ground terminal 149*b* contacts the dust collection unit ground-receiving terminal 549. As a result, high voltage is applied to the dust collection unit 540.

When the case 501 and 502 is withdrawn from the body 130, the electrification unit power terminal 148*a* is separated from the electrification unit power-receiving terminal 518, and the electrification unit ground terminal 149*a* is separated from the electrification unit ground-receiving terminal 519. As a result, the application of high voltage to the electrification unit 510 is interrupted.

When the case 501 and 502 is withdrawn from the body 130, the dust collection unit power terminal 148*b* is separated from the dust collection unit power-receiving terminal 548, and the dust collection unit ground terminal 149*b* is separated from the dust collection unit ground-receiving terminal 549. As a result, the application of high voltage to the dust collection unit 540 is interrupted.

The electric dust collector 1 includes a ground wire 583*a* for electrically interconnecting the opposite film plate 523 and the ground 582*a*. The electric dust collector includes a high-voltage wire 584*a* for electrically interconnecting the wire discharge film 521 and the high-voltage generator 581*a*. The high-voltage generator 581*b* may be configured such that the voltage difference between the first conductive layers 551*a* and the second conductive layers 551*b* is about 7 to 9 kV.

The electrification unit power terminal 148*a* and the electrification unit power-receiving terminal 518 are disposed on the high-voltage wire 584*a*. The electrification unit power terminal 148*a* and the electrification unit power-receiving terminal 518 function as a switch for electrically opening and closing the high-voltage wire 584*a*. The electrification unit ground terminal 149*a* and the electrification unit ground-receiving terminal 519 are disposed on the ground wire 583*a*. The electrification unit ground terminal 149*a* and the electrification unit ground-receiving terminal 519 function as a switch for electrically opening and closing the ground wire 583*a*.

The electric dust collector 1 includes a ground wire 583*b* for electrically interconnecting the second conductive layers 551*b* and the ground 582*b*. The electric dust collector 1 includes a high-voltage wire 584*b* for electrically interconnecting the first conductive layers 551*a* and the high-voltage generator 581*b*.

The dust collection unit power terminal 148*b* and the dust collection unit power-receiving terminal 548 are disposed on the high-voltage wire 584*b*. The dust collection unit power terminal 148*b* and the dust collection unit power-receiving terminal 548 function as a switch for electrically opening and closing the high-voltage wire 584*b*. The dust collection unit ground terminal 149*b* and the dust collection unit ground-receiving terminal 549 are disposed on the ground wire 583*b*. The dust collection unit ground terminal 149*b* and the dust collection unit ground-receiving terminal 549 function as a switch for electrically opening and closing the ground wire 583*b*.

The electric dust collector 1 includes a cutoff switch 145 for enabling or disabling the operation of the electric dust collector 1. The cutoff switch 145 may be disposed at the body 130. The cutoff switch 145 enables or disables the supply of power to the high-voltage generator 581. The cutoff switch 145 may enable or disable the supply of power to other parts of the electric dust collector 1 that need to receive power (e.g. a sensor and a display).

The cutoff switch 145 enables the operation of the electric dust collector 1 only in the state in which the case 501 and 502 is settled in the body 130. When the case 501 and 502 is separated from the body 130, the cutoff switch 145 disables the operation of the electric dust collector 1. The cutoff switch 145 disables the operation of the electric dust collector 1 in the state in which the case 501 and 502 is not fully coupled to the body 130 (i.e. the state in which the case 501 and 502 is not settled in the body 130).

The cutoff switch 145 is disposed on the power supply wire 585. The cutoff switch 145 enables or disables the supply of power to the high-voltage generators 581*a* and 581*b*. When the cutoff switch 145 is pushed, the power supply wire 585 may be short-circuited. When the cutoff switch 145 is not pushed, the power supply wire 585 may be open-circuited.

The cutoff switch 145 may be disposed at the inner surface of the body 130. The cutoff switch 145 may be disposed at the inner surface of the body 130 in the direction in which the case 501 and 502 is inserted into the body 130. The cutoff switch 145 may be configured to be pushed in the direction in which the case 501 and 502 is inserted into the body 130.

Figure 8:
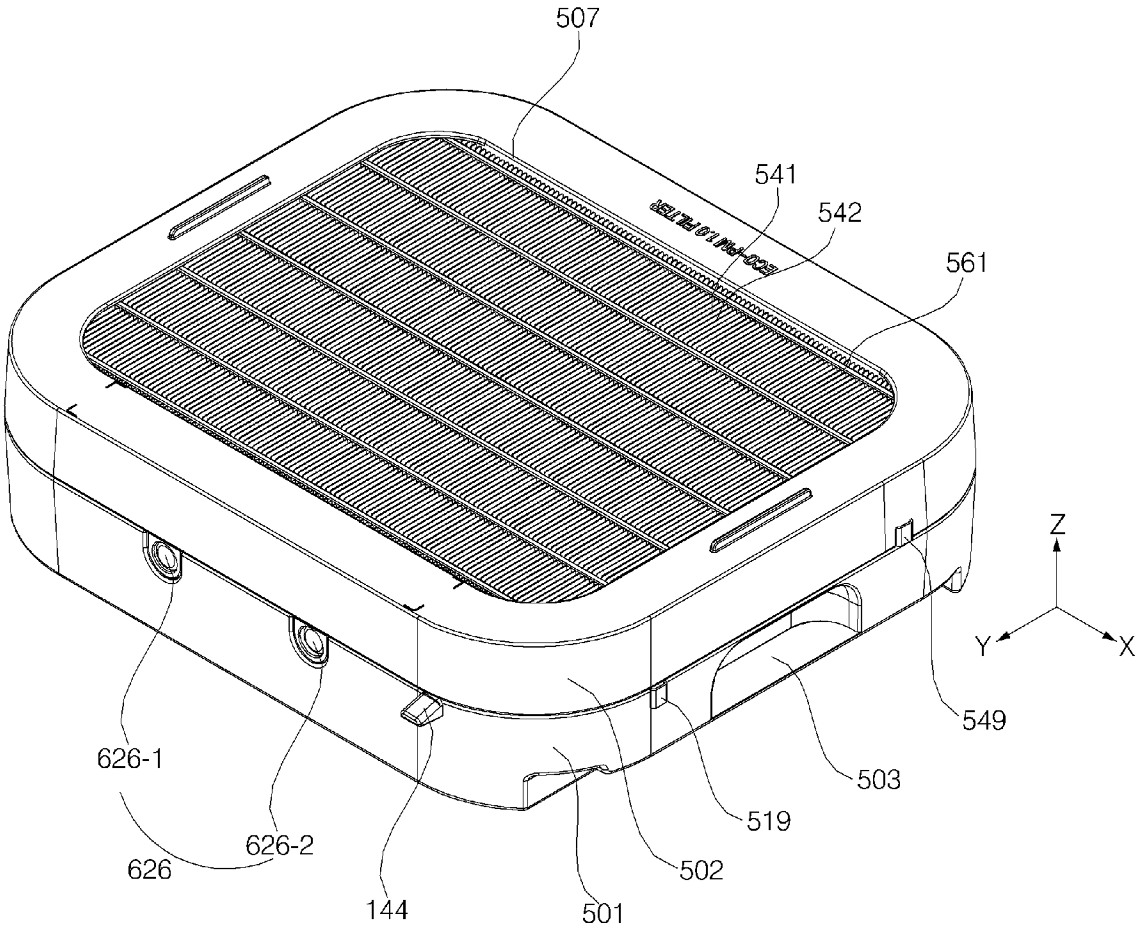
FIG. 8 is a perspective view showing the external appearance of a case of the electric dust collector shown in FIG. 1, excluding a body.
Figure 9:
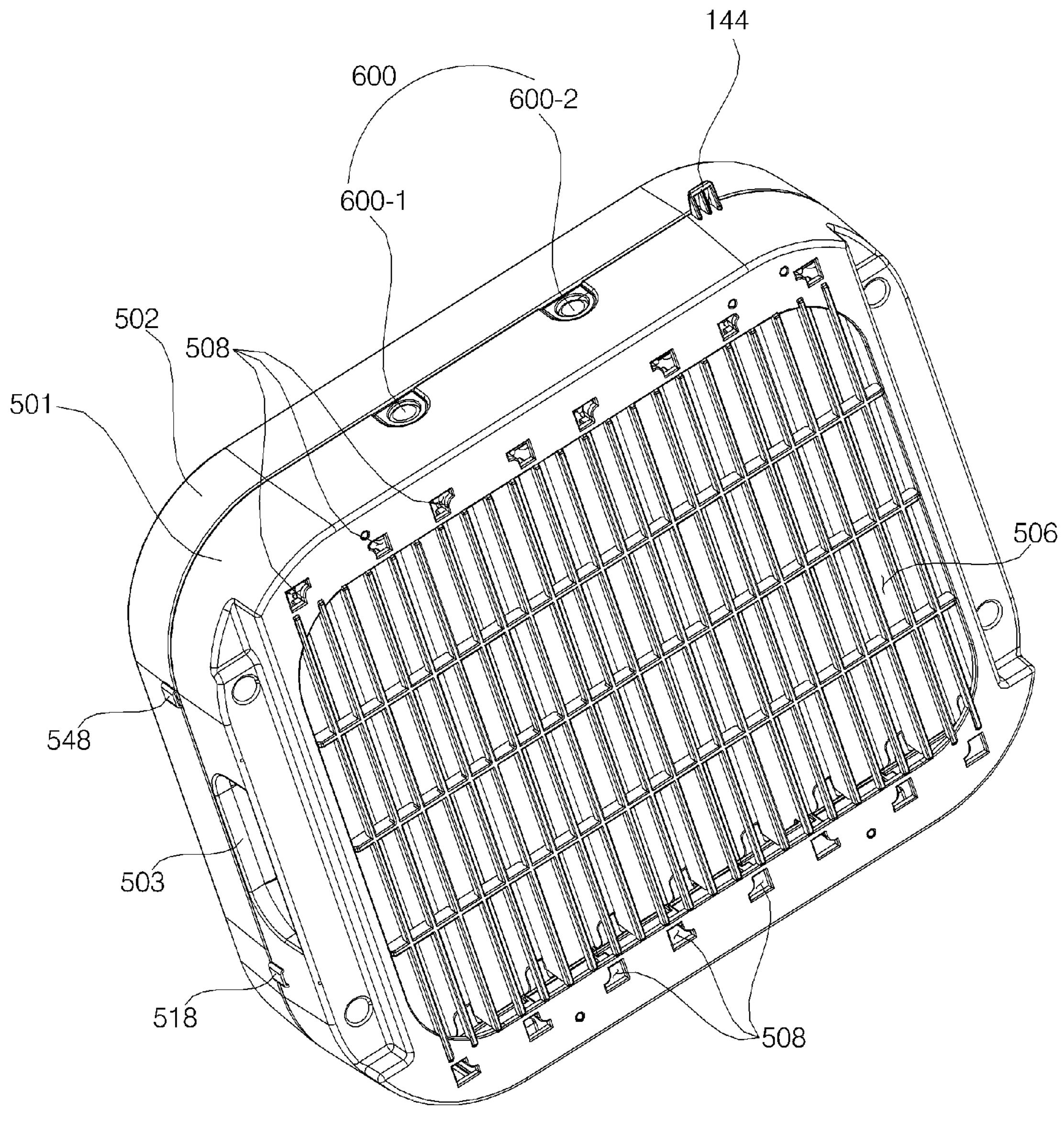
FIG. 9 is a perspective view showing the electric dust collector shown in FIG. 8 when viewed from another side.

The case 501 and 502 includes a cutoff protrusion 144 for pushing the cutoff switch 145 (see FIGS. 8 and 9). The cutoff protrusion 144 is disposed at the side of the filter assembly 10 in the direction in which the case 501 and 502 is inserted into the body 130. The cutoff protrusion 144 protrudes in the direction in which the case 501 and 502 is inserted into the body 130.

The cutoff protrusion 144 is configured to push the cutoff switch 145 in the state in which the case 501 and 502 is settled in the body 130. When the cutoff protrusion 144 pushes the cutoff switch 145, the power supply wire 585 is short-circuited, whereby power may be supplied to the high-voltage generator 581. As a result, it is possible to prevent the user from receiving an electric shock when the user contacts the power terminals 148*a* and 148*b* and the ground terminals 149*a* and 149*b* in the state in which the case 501 and 502 is separated from, or not settled in, the body 130.

The electric dust collector 1 includes a short-circuit switch 600 configured such that the first conductive layers 551*a* and the second conductive layers 551*b* are short-circuited when it is turned ON and such that the first conductive layers 551*a* and the second conductive layers 551*b* are not short-circuited when it is turned OFF. Specifically, the first conductive layers 551*a* are connected to each other in parallel, and a short-circuit wire 600*a* is electrically connected to one end of the short-circuit switch 600 at the parallel connection point of the first conductive layers 551*a*. In addition, the second conductive layers 551*b* are connected to each other in parallel, and a short-circuit wire 600*b* is electrically connected to the other end of the short-circuit switch 600 at the parallel connection point of the second conductive layers 551*b*. The short-circuit switch 600 is disposed on the short-circuit wires 600*a* and 600*b*.

The short-circuit switch 600 is turned OFF in the state in which the case 501 and 502 is settled in the body 130. The short-circuit switch 600 is turned ON in the state in which the case 501 and 502 is separated from, or not settled in, the body 130.

In the state in which the case 501 and 502 is separated from, or not settled in, the body 130, the first conductive layers 551*a* and the second conductive layers 551*b* are short-circuited, whereby electric charge in the dust collection unit 540 is discharged. In the state in which the case 501 and 502 is settled in the body 130, the short-circuited state of the first conductive layers 551*a* and the second conductive layers 551*b* is released, whereby electric charge is formed in the dust collection unit 540 such that an electric field can be generated.

The body 130 includes a short-circuit protrusion (not shown) for pushing the short-circuit switch 600. The short-circuit protrusion is disposed at the side of the inner surface of the body 130 that faces the direction in which the case 501 and 502 is inserted into the body 130. The short-circuit protrusion protrudes in the direction in which the case 501 and 502 is withdrawn from the body 130.

The short-circuit switch 600 includes a pressurization part 626 exposed at the position corresponding to the short-circuit protrusion so as to be pushed in the state in which the case 501 and 502 is separated from, or not settled in, the body 130. The short-circuit switch 600 may include an elastic member (not shown) disposed at the side of the pressurization part 626 opposite the pressurization surface thereof. When the pressurization part 626 is pushed, the elastic member is elastically compressed. When the pushed state of the pressurization part 626 is released, the elastic member is restored.

A plurality of short-circuit switches 600 may be provided. The electric dust collector 1 may include a plurality of short-circuit switches 600.

The short-circuit switches 600 are connected to each other in parallel by the short-circuit wires 600*a* and 600*b*. When at least one of the short-circuit switches 600 is short-circuited, therefore, the first conductive layers 551*a* and the second conductive layers 551*b* are short-circuited. Even in the case in which one of the short-circuit switches 600 is not normally short-circuited due to the presence of foreign matter or breakage, therefore, the first conductive layers 551*a* and the second conductive layers 551*b* are short-circuited as long as at least another of the short-circuit switches 600 is normally short-circuited, thereby further improving the user's safety.

In this embodiment, the electric dust collector 1 includes two short-circuit switches 600-1 and 600-2. The short-circuit switches 600-1 and 600-2 may be arranged so as to be spaced apart from each other horizontally. The electric dust collector 1 may include a first short-circuit switch 600-1 and a second short-circuit switch 600-2.

The first short-circuit switch 600-1 includes a first pressurization part 652-1 disposed at the outer surface of the case 501 and 502. The second short-circuit switch 600-2 includes a second pressurization part 652-2 disposed at the outer surface of the case 501 and 502. The first short-circuit switch 600-1 and the second short-circuit switch 600-2 are arranged so as to be spaced apart from each other.

The body 130 includes a plurality of short-circuit protrusions (not shown) respectively formed at the positions corresponding to the pressurization parts 652-1 and 652-2. The short-circuit protrusions may include a first short-circuit protrusion (not shown) for pushing the first short-circuit switch 600-1 and a second short-circuit protrusion (not shown) for pushing the second short-circuit switch 600-2. In the state in which the case 501 and 502 is separated from, or not setted in, the body 130, the short-circuit protrusions push the pressurization parts 652-1 and 652-2, respectively.

Referring to FIGS. 8 and 9, the case 501 and 502 defines the external appearance of the electric dust collector 1. The case 501 and 502 includes a grip 503 for allowing the user to lift the case 501 and 502. The grip 503 may be formed at each of the opposite sides of the case 501 and 502. The grips 503 may be depressed in the case 501 and 502.

The case 501 and 502 has an inlet port 506 through which air is introduced to the electrification unit 510. The case 501 and 502 has an outlet port 507 through which air is discharged from the dust collection unit 540. A base gap maintenance part 561, a description of which will follow, may be disposed in the outlet port 507 so as to be exposed outward.

The case 501 and 502 has a drainage hole 508, through which water, introduced into the case 501 and 502 for washing, is drained from the case 501 and 502. A plurality of drainage holes 508 may be provided. The drainage holes 508 may be arranged so as to be spaced apart from each other.

The drainage holes 508 may be formed in the sides of the outer surface of the case 501 and 502 in which the inlet port 506 is formed so as to be spaced apart from the inlet port 506. The drainage holes 508 may be formed in the opposite sides of the outer surface of the case 501 and 502 in the longitudinal direction Y of the opposite film plates 523. The drainage holes 508 may be formed in the opposite sides of the outer surface of the case 501 and 502 in the longitudinal direction Y of the films 540*a*.

Figure 10:
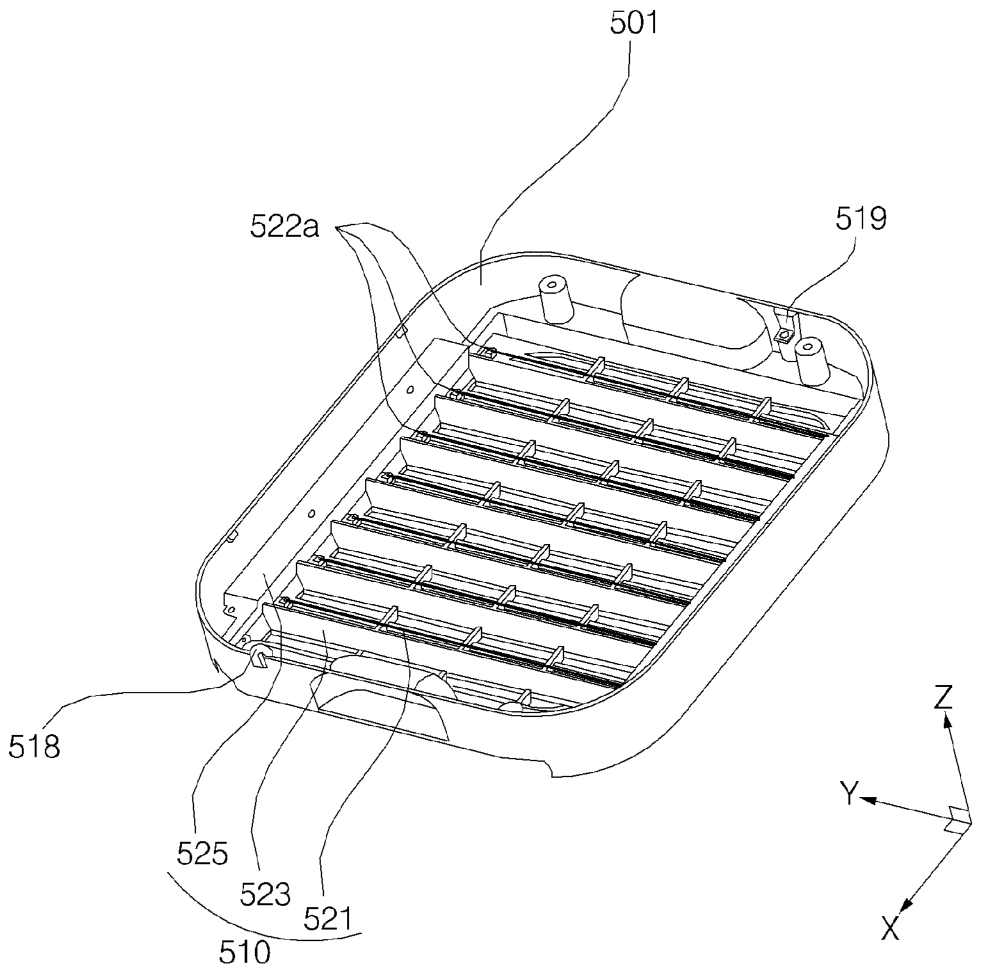
FIG. 10 is an exploded perspective view of the electric dust collector of FIG. 8 showing the state in which the electrification unit and an electrification unit case are assembled.
Figure 11:
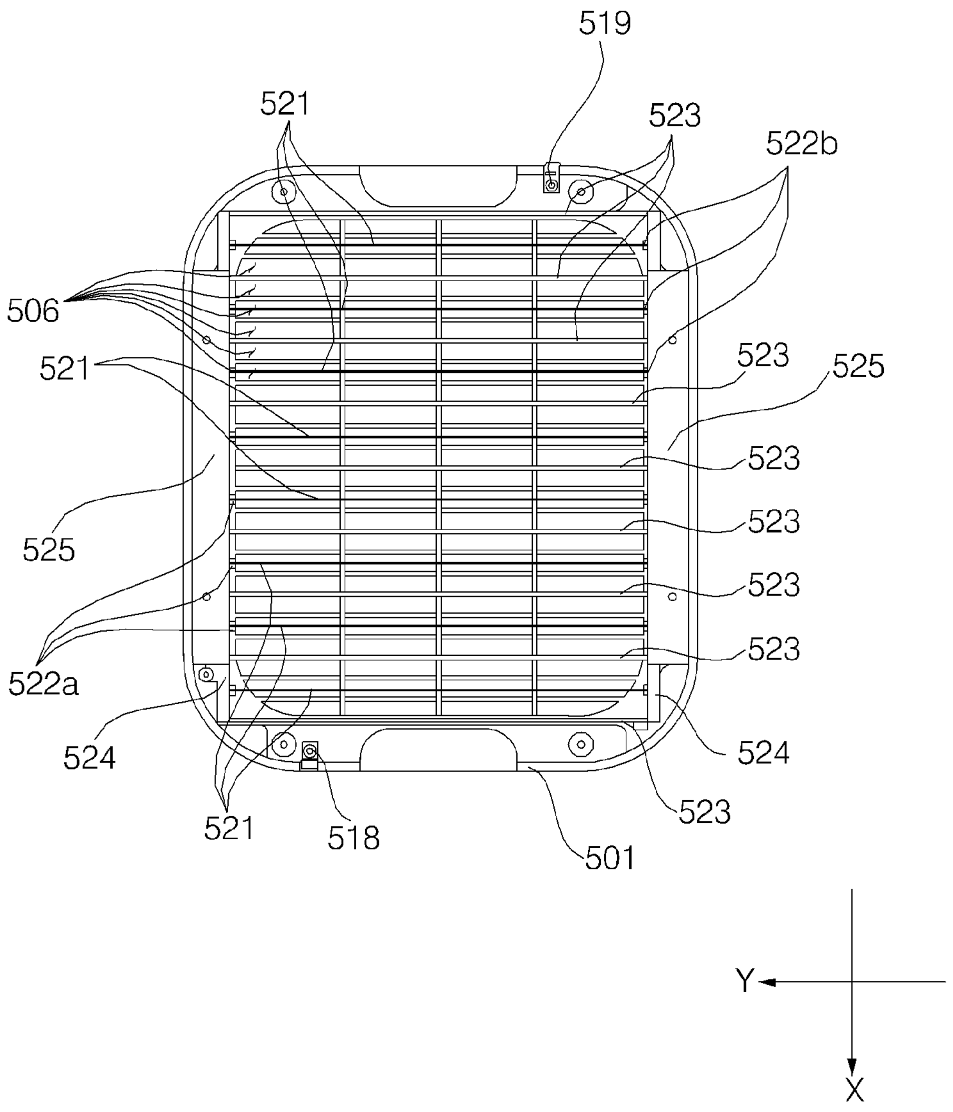
FIG. 11 is an elevation view showing the electrification unit and the electrification unit case of FIG. 10.

Referring to FIGS. 10 and 11, the electrification unit 510 includes a wire discharge film 521, to which high voltage is applied, and an opposite film plate 523 spaced apart from the wire discharge film 521.

When voltage is applied to the wire discharge film 521, corona discharge occurs between the wire discharge film 521 and the opposite film plate 523. As a result, molecules in the air may be ionized, whereby negative ions, such as OH− or O−, or positive ions, such as H+, may be generated. The generated ions electrify dust particles in the air. The negative ions may provide electrons to the dust particles such that the dust particles are electrified and act as a negative film. The positive ions may remove electrons from the dust particles such that the dust particles are electrified and act as a positive film.

A plurality of opposite film plates 523 may be disposed. The opposite film plates 523 may be spaced apart from each other so as to face each other in the state in which the wire discharge film 521 is disposed between the respective opposite film plates 523.

The opposite ends of the opposite film plates 523 may be connected to each other via the film plate connection parts 524. The film plate connection parts 524 are disposed in the horizontal plane, and the opposite film plates 523 are disposed in the plane perpendicular to the film plate connection parts 524.

The film plate connection parts 524 and the opposite film plates 523 may be integrally formed by incising the middle part of a metal sheet and bending the incised middle part by 90 degrees. Specifically, the film plate connection parts 524 and the opposite film plates 523 may be integrally formed as follows. The middle part of a metal sheet is incised to a length equal to that of the long side of each of the opposite film plates 523, excluding the opposite ends of the metal sheet, which will serve as the film plate connection parts 524. The opposite ends of the middle part of the metal sheet, incised to the length equal to that of the long side of each of the opposite film plates 523, are incised to a length equal to that of the short side of each of the opposite film plates 523 so as to be perpendicular to the incised middle part. The part of the metal sheet incised in a bracket shape (i.e. the middle part incised to the length equal to that of the long side of each of the opposite film plates 523 and the opposite ends of the middle part incised to the length equal to that of the short side of each of the opposite film plates 523 so as to be perpendicular to the incised middle part) is bent by 90 degrees. The bent part becomes a corresponding one of the opposite film plates 523.

A plurality of wire discharge films 521 may be disposed. The wire discharge films 521 may be spaced apart from each other so as to be parallel to each other. The opposite film plates 523 may be disposed between the respective wire discharge films 521 so as to be parallel to the wire discharge films 521.

The wire discharge films 521 may be connected to each other in series. That is, the wire discharge films 521 may be constituted by a single wire member. In this embodiment, a single wire member extends from one one-side wire support part 522*a* to one opposite-side wire support part 522*b* so as to constitute a wire discharge film 521. The wire member extends from the one opposite-side wire support part 522*b* to another opposite-side wire support part 522*b* adjacent to the one opposite-side wire support part 522*b* so as to constitute a wire series connection part (not shown). The wire member extends from the another opposite-side wire support part 522*b* to another one-side wire support part 522*a* adjacent to the one one-side wire support part 522*a* so as to constitute another wire discharge film 521. In this way, the wire discharge films 521 are connected to the wire series connection parts via the wire support parts 522*a* and 522*b*, which are disposed at opposite sides so as to be spaced apart from each other by a predetermined distance.

Each of the wire support parts 522 includes a vertical member extending in the air flow direction. The wire member may be bent at the vertical member while being supported by the vertical member.

In this embodiment, a plurality of wire discharge films 521 and a plurality of opposite film plates 523 are alternately arranged so as to be spaced apart from each other in the direction X perpendicular to the air flow direction A. The wire discharge films 521 and the opposite film plates 523 are disposed at the downstream side of the inlet port 506.

The film plate connection parts 524 are disposed at the opposite ends of the opposite film plates 523 so as to extend in the direction X, which is perpendicular to the opposite film plates 523. The wire series connection parts are disposed at the opposite ends of the wire discharge films 521 so as to extend in the direction X, which is perpendicular to the wire discharge films 521.

The wire discharge films 521 may be disposed between the respective opposite film plates 523 so as to be adjacent to the upstream sides thereof. The wire series connection parts may be disposed in the same plane as the wire discharge films 521. The film plate connection parts 524 may be disposed in the plane at the downstream sides of the opposite film plates 523 such that the wire series connection parts are spaced further apart from the film plate connection parts 524. The reason for this is that it is necessary to reduce the possibility of sparks occurring between the wire series connection parts and the film plate connection parts 524, since high voltage is also applied to the wire series connection parts and the film plate connection parts 524 are also made of a metal material and are electrically connected to the opposite film plates 523.

The wire discharge films 521 and the opposite film plates 523 are attached to the electrification unit case 501. The opposite ends of the portion of the wire member corresponding to each of the wire discharge films 521 are attached to the electrification unit case 501. High voltage is applied to the portion of the wire member via the fixed ends thereof.

The electrification unit 510 includes a spark prevention part 525 attached to the electrification unit case 501 for supporting the opposite film plates 523. The spark prevention part 525 attaches the film plate connection parts 524.

The spark prevention part 525 is disposed at each end of each of the opposite film plates 523. The spark prevention part 525 includes a shielding member (not shown) interposed between each of the film plate connection parts 524, which are disposed so as to be vertically spaced apart from each other, and a corresponding one of the wire series connection parts. The shielding member may be made of an insulative material. The shielding member reduces the likelihood of sparks occurring between each of the wire series connection parts and a corresponding one of the film plate connection parts 524.

The spark prevention part 525 is provided with a recess, into which each of the film plate connection parts 524 is inserted. The recess, into which each of the film plate connection parts 524 is inserted, is depressed in the longitudinal direction of the opposite film plates 523. The member having the recess, into which each of the film plate connection parts 524 is inserted, surrounds the upper surface and the lower surface of each of the film plate connection parts 524. The member for surrounding the lower surface of each of the film plate connection parts 524 may be embodied by the shielding member.

Figure 12:
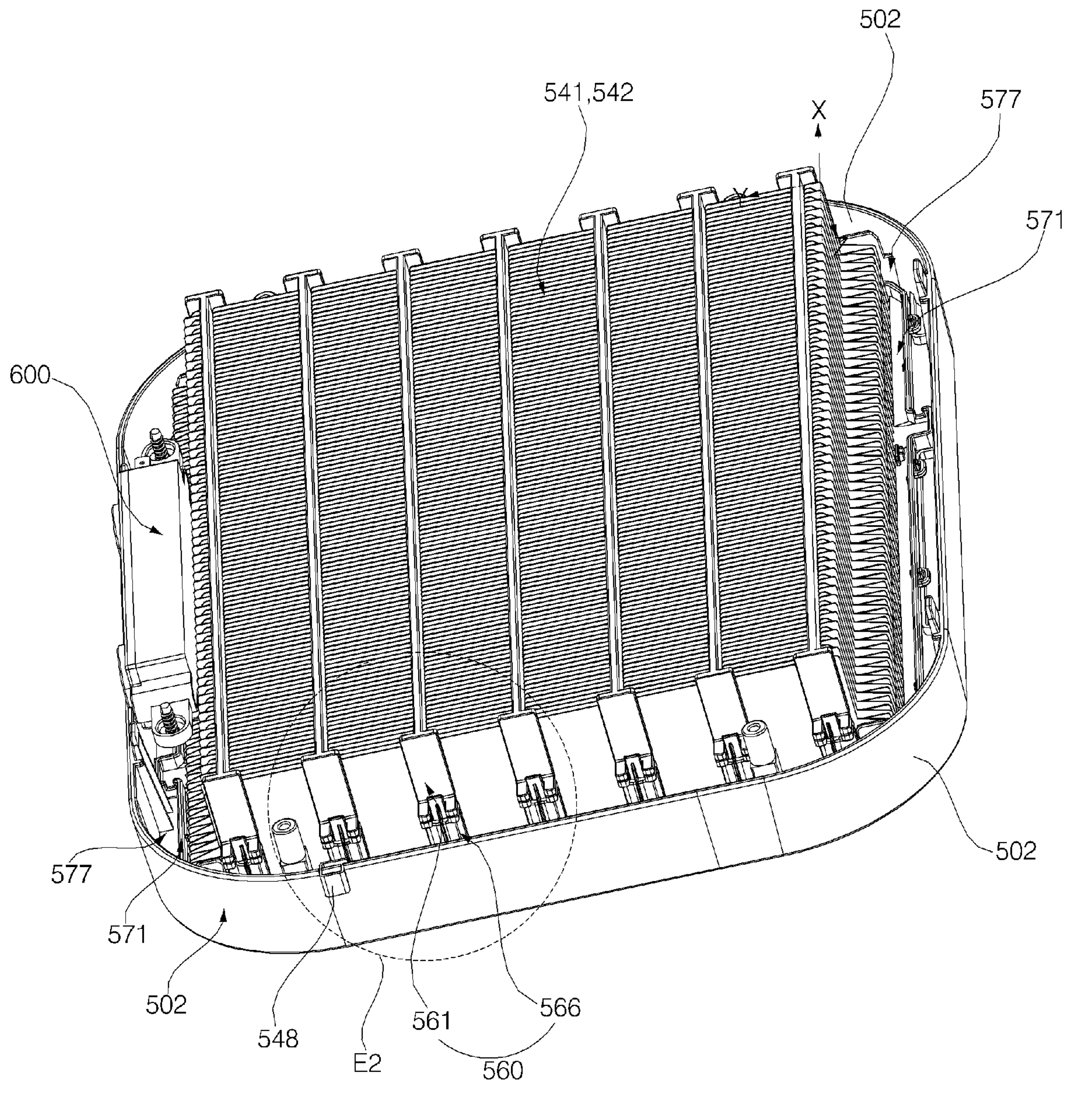
FIG. 12 is an exploded perspective view of the electric dust collector of FIG. 8 showing the state in which the dust collection unit and a dust collection unit case are assembled.
Figure 13:
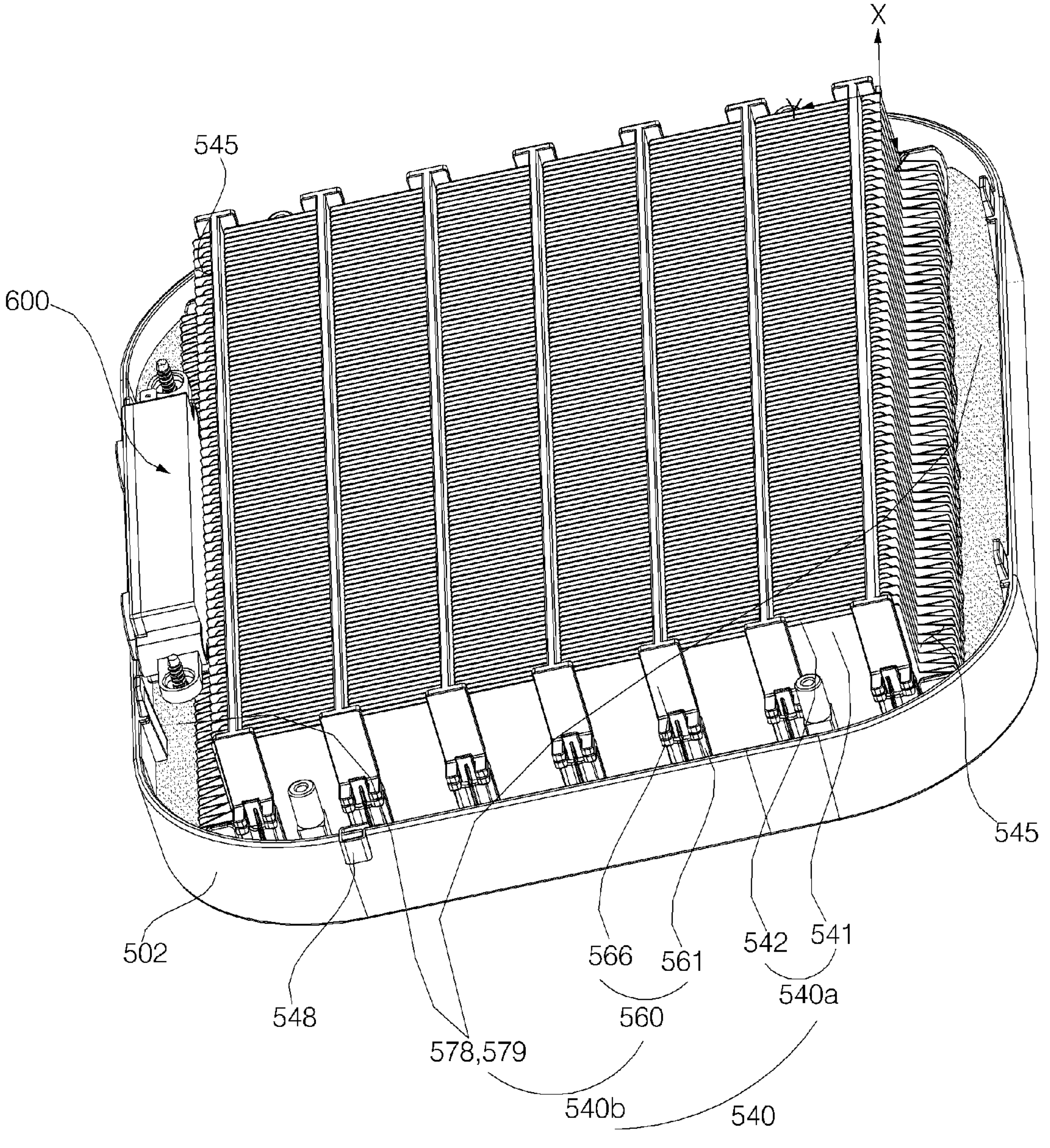
FIG. 13 is a perspective view showing the dust collection unit and the dust collection unit case of FIG. 12, excluding molding parts.

Referring to FIGS. 12 and 13, the dust collection unit 540 includes a film 540*a* for collecting electrified dust particles. A plurality of films 540*a* may be provided. The dust collection unit 540 includes a plurality of films 540*a* for collecting electrified dust particles.

The dust collection unit 540 includes a fixing part 540*b* for attaching the film 540*a* in the case 501 and 502. The film 540*a* is received in the case 501 and 502. A plurality of films 540*a* may be received in the case 501 and 502. The fixing part 540*b* may attach the films 540*a* in the dust collection unit case 502.

The films 540*a* may be arranged so as to face each other in the state in which gaps S are formed between the respective films. Each of the films 540*a* is formed in the shape of a band that is longer in the longitudinal direction Y than in the lateral direction Z. The films 540*a* are arranged side by side so as to face each other in the state in which gaps S are formed between the respective films to constitute a film group. The films 540*a* are disposed such that one side of each of the films 540*a* in the lateral direction Z faces the outlet port 507.

The films 540*a* include a plurality of first films 541, to which relatively high potential is applied, and a plurality of second films 542, to which relatively low potential is applied. The first films 541 and the second films 542 are alternately arranged. The first films 541 and the second films 542 are alternately arranged so as to face each other in the state in which gaps S are formed between the respective films.

The fixing part 540*b* includes gap maintenance parts 560 disposed on at least one of the lateral opposite sides of the film group for maintaining the gap S.

The gap maintenance parts 560 are attached in the case 501 and 502. In this embodiment, the gap maintenance parts 561 and 566 are attached only to the dust collection unit case 502. The gap maintenance parts 560 may also support the films 540*a*.

The gap maintenance parts 560 may include roof gap maintenance parts 566, which are disposed at one of the opposite sides of the film group in the lateral direction Z that is distant from the inner surface of the dust collection unit case 502. The gap maintenance parts 560 may include base gap maintenance parts 561, disposed at one side of the film group in the lateral direction Z, and roof gap maintenance parts 566, disposed at the other side of the film group in the lateral direction Z.

The fixing part 540*b* includes molding parts 578 and 579 that fill a predetermined space 576 in the state in which a portion of each of the films 540*a* is inserted in the space 576.

The molding parts 578 and 579 attach the films 540*a* via hardening of predetermined paste. The molding parts 578 and 579 are formed by hardening the paste in the state in which a portion of each of the films 540*a* is immersed in the paste.

The films 540*a* are arranged such that the lateral direction Z of the films is the upward-downward direction. However, the present invention is not limited thereto. The films 540*a* may be arranged side by side so as to be aligned in the longitudinal direction Y. The films 540*a* are arranged such that gaps S are formed between the respective films in the direction X, which is perpendicular to both the lateral direction Z and the longitudinal direction Y.

Figure 6:
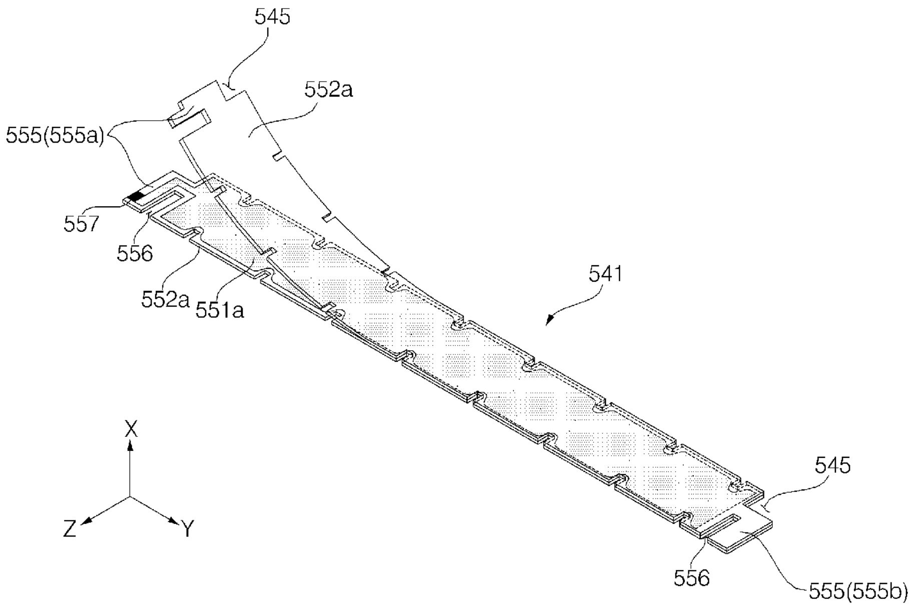
FIG. 6 is a perspective view showing the structure of a film, more specifically, a view showing a first film.
Figure 7:
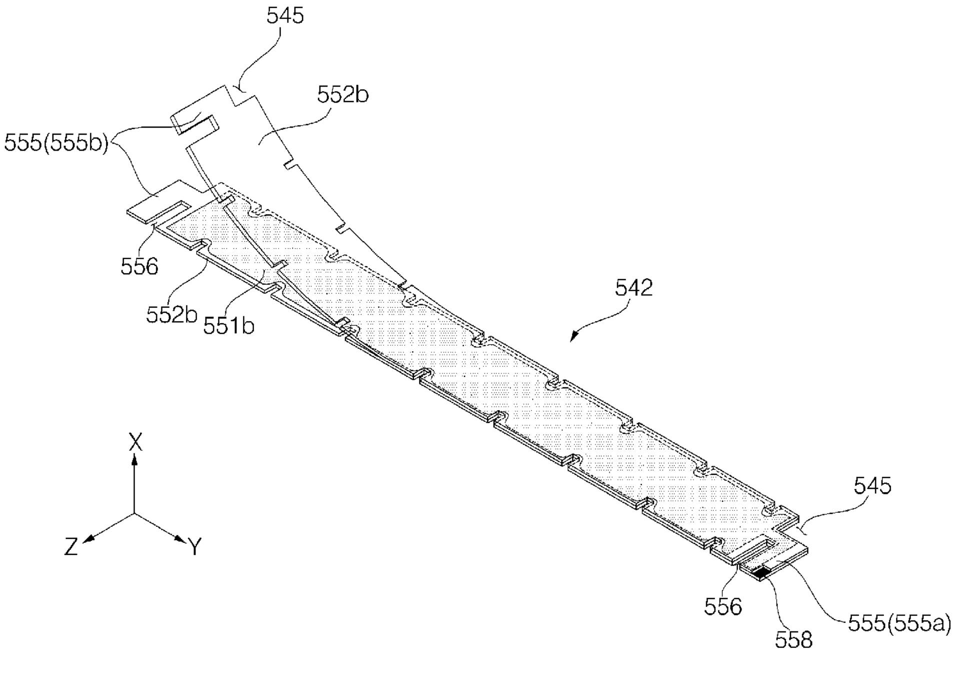
FIG. 7 is a perspective view showing the structure of a film, more specifically, a view showing a second film.

Referring to FIGS. 6 and 7, each of the first films 541 and the second films 542 is formed in the shape of a band. The length of the first film 541 and the second film 542 may be about 200 to 250 mm. The first film 541 and the second film 542 may be formed in the shape of a flat plate. At least a portion of the first film 541 and the second film 542 may be curved in the direction X.

The conductive layers 551*a* and 551*b* of the films 540*a* may be made of a carbon material. The conductive layers 551*a* and 551*b* may have a thickness of 10 to 100 um. The conductive layer 551*a* of each first film 541 constitutes a high-potential electrode, and the conductive layer 551*b* of each second film 542 constitutes a low-potential electrode.

The insulative layers 552*a* and 552*b* respectively cover the conductive layers 551*a* and 551*b*, excluding exposed parts 557 and 558. The insulative layers 552*a* and 552*b* may be made of a material, such as polypropylene (PP), polyethylene terephthalate (PET), polyethylene naphthalate (PEN), or polyurethene (PU), containing a nano-filler, such as $TiO_2$, $Al_2O_3$, or $SiO_2$. The insulative layers 552*a* and 552*b* may have a thickness of 100 to 1500 um.

The conductive layer 551*a* may be patterned on one surface of one of the insulative layers 552*a* by screen printing, and the other of the insulative layers 552*a* may be attached to the one of the insulative layers 552*a* while covering the pattern excluding a portion of the pattern. In the same manner, the conductive layer 551*b* may be patterned on one surface of one of the insulative layers 552*b* by screen printing, and the other of the insulative layers 552*b* may be attached to the one of the insulative layers 552*b* while covering the pattern excluding a portion of the pattern.

The films 540*a* include exposed parts 557 and 558, through which portions of the conductive layers 551*a* and 551*b* are exposed. Portions of the conductive layers 551*a* and 551*b* of the films 540*a* are exposed to the outside, and the remainders of the conductive layers 551*a* and 551*b* of the films 540*a* are covered by the insulative layers 552*a* and 552*b*.

When relatively high potential is applied to the first conductive layer 551*a* and relatively low potential is applied to the second conductive layer 551*b*, an electric field is generated between the conductive layers 551*a* and 551*b*. Dust particles electrified by the electrification unit 510 receive electric force in the electric field depending upon the electrified polarity thereof. As a result, the dust particles stick to a corresponding one of the insulative layers 552*a* of the first film 541 or a corresponding one of the insulative layers 552*b* of the second film 542.

Each film 540*a* includes an insertion part 555 extending from at least one end thereof in the longitudinal direction Y so as to be inserted into the space 576. The insertion part 555 may be formed at each end of each of the first films 541 and the second films 542 in the longitudinal direction Y.

Figure 14A:
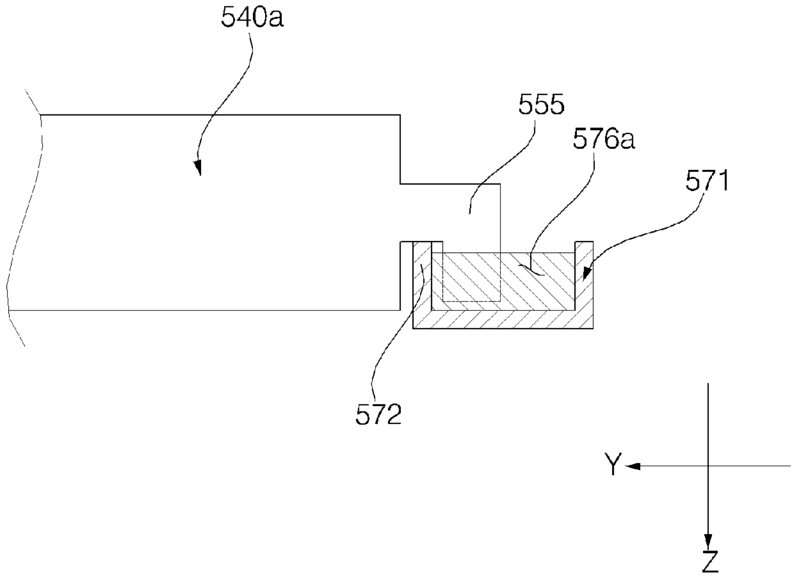
FIG. 14 is a sectional conceptual view showing an insertion space of a conductor-receiving part of FIG. 12 filled with an electrode connection part in the state in which a portion of the film is inserted in the insertion space of the conductor-receiving part, wherein FIG. 14(*a*) is a view of this embodiment and FIG. 14(*b*) is a view of another embodiment.
Figure 14B:
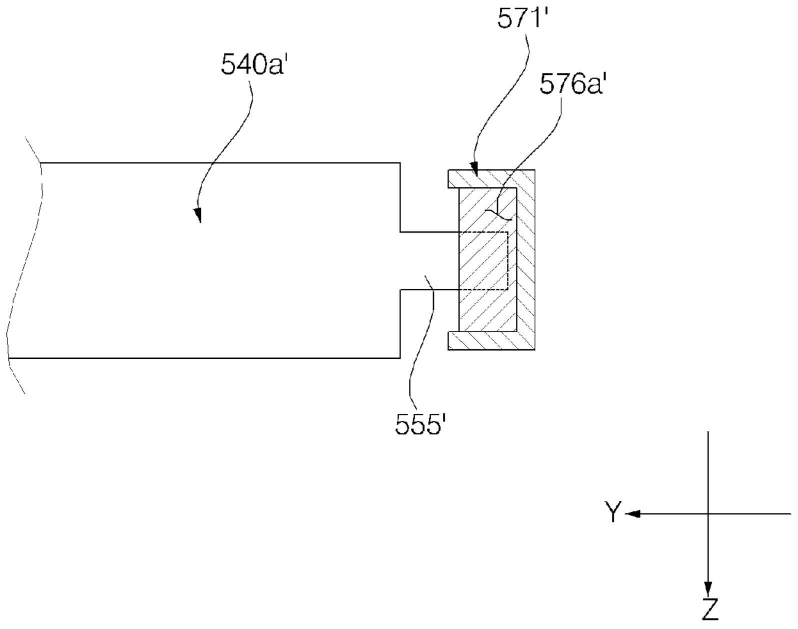

Referring to FIGS. 13 and 14(*a*), the insertion part 555 according to this embodiment extends from at least one end of each film in the longitudinal direction Y and is bent in the lateral direction Z. The films 540*a* include insertion parts 555 extending from opposite ends thereof in the longitudinal direction Y and bent in the lateral direction Z. An insertion port of an insertion space 576*a* of a conductor-receiving part 571, a description of which will follow, is formed so as to face the direction in which the insertion parts 555 are bent. The films 540*a* have catching recesses 556, a description of which will follow. Holding ribs 572, a description of which will follow, are inserted into the catching recesses 556.

Referring to FIG. 14(*b*), an insertion part 555' according to another embodiment extends from at least one end of each film in the longitudinal direction Y. A plurality of films 540*a*' includes insertion parts 555' extending from opposite ends thereof in the longitudinal direction Y. An insertion port of an insertion space 576*a*' of a conductor-receiving part 571' is formed so as to face the direction in which the insertion parts 555 extend. The films 540*a*' may have no catching recesses 556.

The exposed parts 557 and 558 are formed at the insertion parts 555. The films 540*a* include insertion parts 555*a* having exposed parts 557 and 558. The films 540*a* may further include insertion parts 555*b* having no exposed parts 557 and 558. One of the films 540*a* may include an insertion part 555*a* formed at one end thereof in the longitudinal direction Y and an insertion part 555*b* formed at the other end thereof in the longitudinal direction Y.

The exposed part 557 formed at each of the first films 541 is disposed at one end of the first film 541 in the longitudinal direction Y. The exposed part 558 formed at each of the second films 542 is disposed at the other end of the second film 542 in the longitudinal direction Y. In this case, the insertion part 555*a* may be formed at one end of the first film 541 in the longitudinal direction Y, and the insertion part 555*b* may be formed at the other end of the first film 541 in the longitudinal direction Y. In addition, the insertion part 555*b* may be formed at one end of the second film 542 in the longitudinal direction Y, and the insertion part 555*a* may be formed at the other end of the second film 542 in the longitudinal direction Y.

Each of the first films 541 is configured such that the conductive layer 551*a* is exposed only at the insertion part 555*a* formed at one end thereof. Each of the second films 542 is configured such that the conductive layer 551*b* is exposed only at the insertion part 555*a* formed at the other end thereof. The high-potential connection part 557 provided at each of the first films 541 is formed only at the insertion part 555*a* formed at one end thereof. The low-potential connection part 558 provided at each of the second films 542 is formed only at the insertion part 555*a* formed at the other end thereof.

Each of the films 540*a* has a catching recess 556 formed in at least one end thereof in the longitudinal direction Y so as to be depressed in the lateral direction Z. The catching recess 556 may be formed in each end of each of the films 540*a* in the longitudinal direction Y.

One surface of the insertion part 555 may define one surface of the catching recess 556. The catching recess 556 may be formed in the shape of a slit that is open at one side thereof.

The case 501 and 502 includes holding ribs 572, which are inserted into the respective catching recesses 556. The holding ribs 572 may be coupled to the dust collection unit case 502.

The holding ribs 572 are engaged into the catching recess 556. The holding ribs 572 protrude from the dust collection unit case 502 toward the catching recess 556. The holding ribs 572 may extend in the direction X in which the films are arranged, a detailed description of which will follow.

At least one of the opposite ends of the films 540*a* in the longitudinal direction Y may be formed so as to have a relatively small length in the lateral direction Z. At least one of the opposite ends of the films 540*a* in the longitudinal direction Y is formed such that one end of each of the films in the lateral direction Z further extends in the longitudinal direction Y. In the state in which the group of films 540*a* is disposed in the dust collection unit case 502, a space 545 extending in the direction X, in which the films are arranged, is formed at one end of the film group in the longitudinal direction Y. In this embodiment, spaces 545, in which the ends of the films 540*a* in the lateral direction Z are open, are formed at the opposite ends of the films 540*a*. The opposite ends of the films 540*a* may be stepped as the result of forming the spaces 545.

Other parts in the case 501 and 502 may be disposed in the spaces 545 of the group of films 540*a*. The short-circuit switches 600 may be disposed in the spaces 545.

The paste may be conductive paste having electrical conductivity. The paste may be insulative paste having electrical insulativity. The paste may include both a conductive paste and an insulative paste, which may be separated from each other.

The molding parts 578 and 579 may comprise an electrode connection part and a cover part, which may be separated from each other. Specifically, molding part 578 may comprise an electrode connection part having electrical conductivity and be referred to as electrode connection part 578, and molding part 579 may comprise a cover part having electrical insulativity and be referred to as cover part 579. Herein, molding part 578 and electrode connection part 578 are used interchangeably and refer to the same structure. Likewise, molding part 579 and cover plate 579 are used interchangeably and refer to the same structure. The molding parts 578 and 579 may be disposed so as to have a layered structure. The cover part 579 having electrical insulativity may cover the electrode connection part 578.

The molding parts 578 and 579 may be formed by hardening the paste. The electrode connection part 578 may be formed by hardening the conductive paste. The cover part 579 may be formed by hardening the insulative paste.

The molding parts 578 and 579 attach the films 540*a*.

The electrode connection part 578 not only attaches the films 540*a* but also functions as an electrical line for supplying power to the conductive layers of the films 540*a*.

The electrode connection part 578 is electrically connected to a voltage source so as to apply voltage to the films 540*a*.

The cover part 579 not only attaches the films 540*a* but also covers the conductive layers of the films 540*a* to achieve waterproofing and insulation.

Referring to FIGS. 15 to 18, the case 501 and 502 includes a conductor-receiving part 571. Specifically, the dust collection unit case 502 includes a conductor-receiving part 571.

The conductor-receiving part 571 is provided in the case 501 and 502. The conductor-receiving part 571 may be integrally formed with the case 501 and 502 by injection molding. In this embodiment, the conductor-receiving part 571 is a separate member, which is coupled to the case 501 and 502.

The conductor-receiving part 571 has an insertion space 576*a*, into which a film 540*a* is inserted. The conductor-receiving part 571 has an insertion space 576*a*, into which a portion of each of a plurality of films 540*a* is inserted. The conductor-receiving part 571 has an insertion space 576*a*, which is filled with the electrode connection parts 578. The conductor-receiving part 571 has an insertion space 576*a*, which is filled with the conductive paste.

The tips of the insertion parts 555 of the films 540*a* are inserted into the insertion space 576*a*. The insertion parts 555 of the films 540*a* are disposed at the opposite ends of the group of films 540*a* in the longitudinal direction Y so as to be aligned in the direction X in which the films are arranged. The insertion space 576*a* extends in the direction X in which the films are arranged.

The conductor-receiving part 571 extends in the direction X in which the films are arranged. The conductor-receiving part 571 has two insertion spaces 576*a* formed at the opposite ends of the films in the longitudinal direction Y so as to extend in the direction X in which the films are arranged. The conductor-receiving part 571 includes a first conductor-receiving part 571*a* having an insertion space 576*a* which is filled with a first electrode connection part 578*a*, a description of which will follow, and a second conductor-receiving part 571*b* having an insertion space 576*a* which is filled with a second electrode connection part 578*b*, a description of which will follow.

The exposed part 557 of the first film is inserted into the insertion space 576*a* of the first conductor-receiving part 571*a*, and the exposed part 558 of the second film is inserted into the insertion space 576*a* of the second conductor-receiving part 571*b*.

The insertion part 555 is inserted into the insertion space 576*a* and is attached by the electrode connection part 578. The holding ribs 572 are inserted into the catching recesses 556 to settle the films 540*a* in the case 501 and 502. Thanks to the provision of the electrode connection part 578, the gap maintenance parts 560 merely maintain the gaps between the films 540*a* without supporting the films 540*a*. As a result, the weight and size of the gap maintenance parts 560 may be minimized.

The electrode connection part 578 fills the insertion space 576*a* in the state of being in contact with the films 540*a*. The electrode connection part 578 fills the insertion space 576*a* in the state of being in contact with the insertion parts 555.

The electrode connection part 578 includes a first electrode connection part 578*a* filling the insertion space 576*a* in the state of being in contact with the exposed parts 557 of the first films and a second electrode connection part 578*b* filling the insertion space 576*a* in the state of being in contact with the exposed parts 558 of the second films.

The first electrode connection part 578*a* fills the insertion space 576*a* of the first conductor-receiving part 571*a*. The second electrode connection part 578*b* fills the insertion space 576*a* of the second conductor-receiving part 571*b*.

The conductor-receiving part 571 has an opening of the insertion space 576*a*. The conductive paste may be injected, and the insertion parts 555 may be inserted, through the opening of the insertion space 576*a*.

The opening formed in the conductor-receiving part 571 may be formed at one side of the conductor-receiving part 571 in the lateral direction Z of the films. In this embodiment, the opening formed in the conductor-receiving part 571 is formed so as to face the electrification unit 510. One side of the conductor-receiving part 571 is opened and depressed to form the insertion space 576*a*.

The conductor-receiving part 571 is disposed on at least one side of the films in the longitudinal direction Y. The conductor-receiving part 571 extends in the direction X in which the films are arranged. The first conductor-receiving part 571*a* is disposed on one side of the films in the longitudinal direction Y, and the second conductor-receiving part 571*b* is disposed on the other side of the films in the longitudinal direction Y.

The conductor-receiving part 571 includes a bottom surface 573 of the insertion space 576*a*. The conductor-receiving part 571 includes partition walls 575 that define opposite sides of the insertion space 576*a* in the direction X in which the films are arranged. The conductor-receiving part 571 includes partition walls 572 and 574 that define opposite sides of the insertion space 576*a* in the longitudinal direction Y of the films.

The conductor-receiving part 571 may include holding ribs 572*a* inserted into the catching recesses 556 for positioning the films 540*a*. The first conductor-receiving part 571*a* includes a first holding rib 572*a* configured to be inserted into a catching recess 556 formed in one end of each of the films 540*a* in the longitudinal direction Y, and the second conductor-receiving part 571*b* includes a second holding rib 572*a* configured to be inserted into a catching recess 556 formed in the other end of each of the films 540*a* in the longitudinal direction Y.

The holding rib 572*a* may constitute one surface that partitions the insertion space 576*a*. The holding rib 572*a* may constitute a portion of the conductor-receiving part 571. In this embodiment, one of the partition walls 572 and 574 into which the catching recesses 556 are fitted, i.e. the partition wall 572, defines the holding rib 572*a*.

The other of the partition walls 572 and 574 opposite the holding rib 572*a*, i.e. the partition wall 574, may be inclined in the lateral direction Z of the films. Consequently, the size of the insertion space 576*a* may be gradually increased toward the other side of the insertion space 576*a* in the lateral direction Z of the films.

The holding rib 572*a* may extend while connecting one end of one of the two partition walls 575 to one end of the other of the two partition walls 575. The partition wall 575 may extend while connecting the other end of one of the two partition walls 575 to the other end of the other of the two partition walls 575.

The partition wall 574 may include a protruding partition wall 574*a* that forms an insertion space 576*a* protruding in the longitudinal direction Y of the films. A recess, into which a conducting wire electrically connected to the electrode connection part 578 is inserted, may be formed in the protruding partition wall 574*a*.

The conductor-receiving part 571 may include a fastening part 574*b* fastened to the case 501 and 502. The fastening part 574*b* may be disposed at the partition wall 574.

Figure 21:
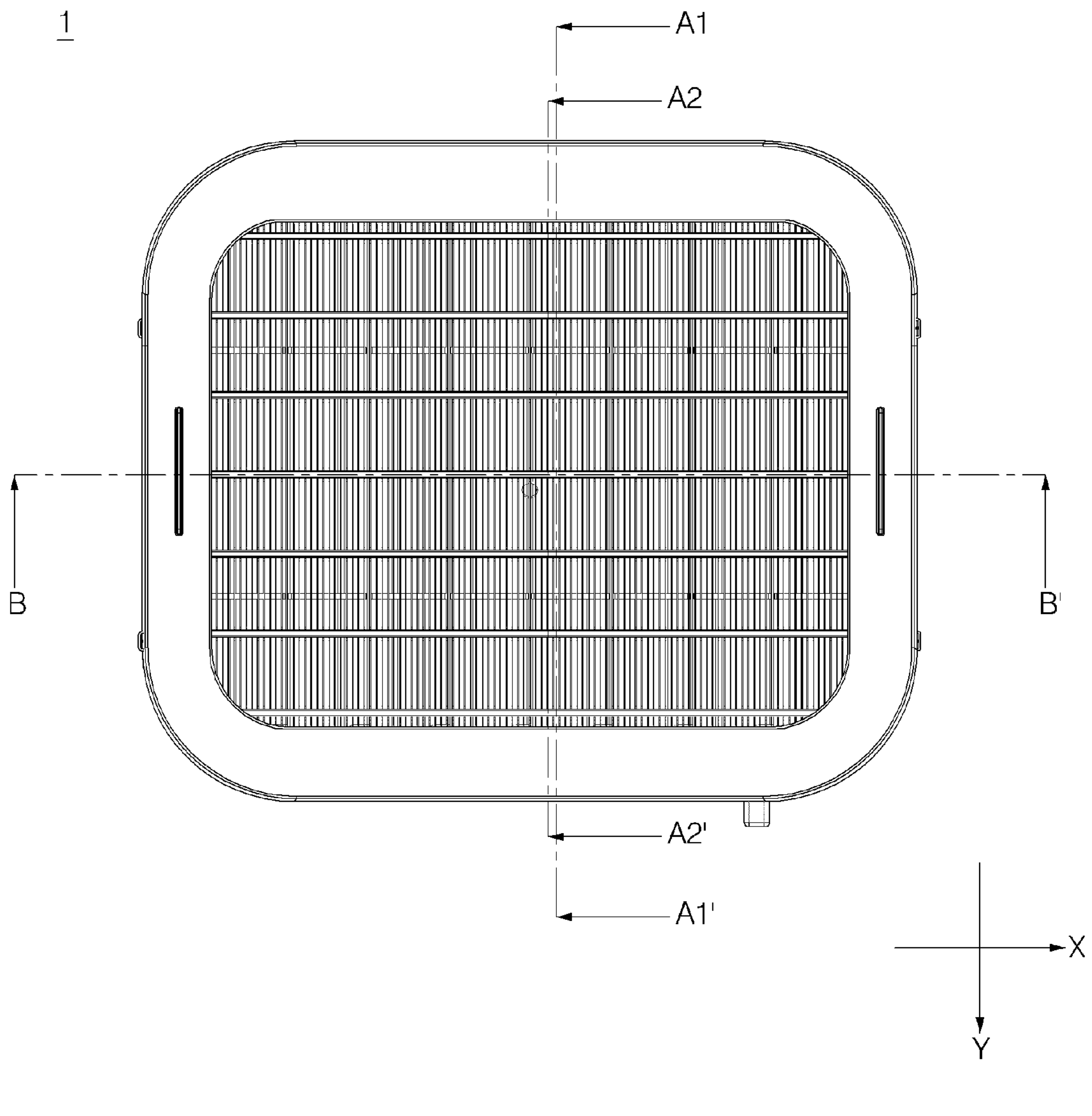
FIG. 21 is an elevation view showing the electric dust collector shown in FIG. 8 when viewed from above.

Referring to FIGS. 12 and 21, the conductor-receiving part 571' includes a metal member 5781 inserted and disposed in the insertion space 576*a*. The metal member 5781 is covered by the electrode connection part 578 in the state of being in contact with the electrode connection part 578.

A conducting wire electrically connected to a voltage source is attached to the metal member 5781. The metal member 5781 is electrically connected to the voltage source. The metal member 5781 is electrically connected to the electrode connection part 578, which covers the metal member 5781. The metal member 5781 may contact the exposed parts 557 and 558. The metal member 5781 disposed in the first conductor-receiving part 571*a* may contact the exposed parts 557 of the first films, and the metal member 5781 disposed in the second conductor-receiving part 571*b* may contact the exposed parts 558 of the second films.

The metal member 5781 may extend in the longitudinal direction X of the electrode connection part 578. The metal member 5781 may be disposed on the bottom surface 573 of the conductor-receiving part 571 while contacting the bottom surface 573. The metal member 5781 may be disposed on the bottom of the insertion space 576*a*.

The metal member 5781 includes a conducting wire connection part 579*a*. The conducting wire connection part 579*a* may be made of the same material as the metal member 5781. The conducting wire connection part 579*a* may be bent. The conducting wire connection part 579*a* may be formed by incising and lifting a portion of the metal member 5781. The conducting wire connection part 579*a* may be inserted into a tip socket of the conducting wire so as to be electrically connected to the conducting wire.

The metal member 5781 has the effect of reducing electrical resistance in a circuit formed by the electrode connection part 578.

Figure 19:
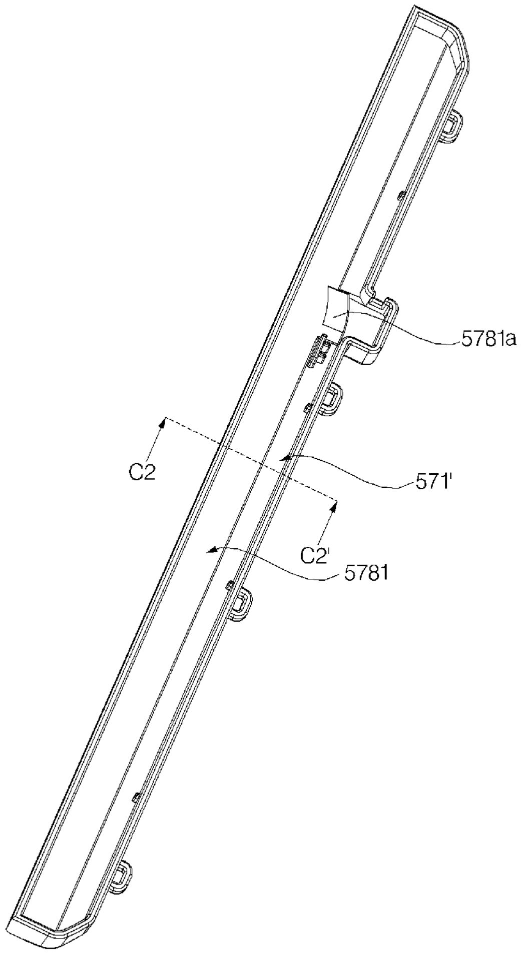
FIG. 19 is a perspective view showing a metal member added to the conductor-receiving part of FIG. 17 in accordance with another embodiment.
Figure 20:
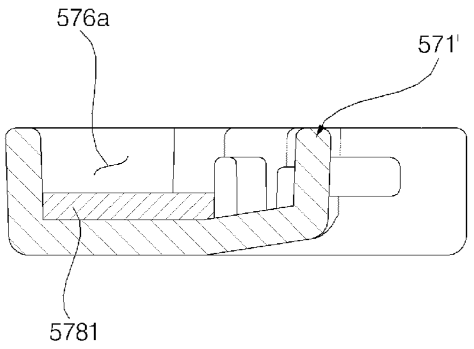
FIG. 20 is a sectional view taken along line C2-C2' of FIG. 19.

Referring to FIGS. 19 and 20, the case 501 and 502 includes a molding-receiving part 577. Specifically, the dust collection unit case 502 includes a molding-receiving part 577.

The molding-receiving part 577 is provided in the case 501 and 502. The molding-receiving part 577 may be a separate member, which is fastened to the case 501 and 502. In this embodiment, the molding-receiving part 577 is integrally formed with the dust collection unit case 502 by injection molding.

The molding-receiving part 577 has a molding space 576*b* filled with a cover part 579 in the state of being in contact with the films 540*a*. The molding-receiving part 577 has a molding space 576*b*, into which with a portion of each of the films 540*a* is inserted. The molding-receiving part 577 has a molding space 576*b* that is filled with the cover part 579. The molding-receiving part 577 has a molding space 576*b* that is filled with the insulative paste.

The conductor-receiving part 571 may be disposed in the molding space 576*b*. The molding space 576*b* may be larger than the insertion space 576*a*. The insertion space 576*a* is a specific space defined in the molding space 576*b*. The molding space 576*b* includes the insertion space 576*a*.

The tips of the insertion parts 555 of the films 540*a* are inserted into the molding space 576*b*. The insertion parts 555 of the films 540*a* are disposed at the opposite ends of the group of films 540*a* in the longitudinal direction Y so as to be aligned in the direction X in which the films are arranged. The molding space 576*b* extends in the direction X in which the films are arranged.

The molding-receiving part 577 extends in the direction X in which the films are arranged. The molding-receiving part 577 has two molding spaces 576*b* formed at the opposite ends of the films in the longitudinal direction Y so as to extend in the direction X in which the films are arranged. The molding-receiving part 577 includes a first molding-receiving part 577*a* having a molding space 576*b* which is filled with a first electrode connection part 578*a* and a second molding-receiving part 577*b* having a molding space 576*b* which is filled with a second electrode connection part 578*b*.

The exposed parts 557 and 558 are disposed in the molding space 576*b*. The exposed parts 557 of the first films are disposed in the molding space 576*b* of the first molding-receiving part 577*a*. The exposed parts 558 of the second films are disposed in the molding space 576*b* of the second molding-receiving part 577*b*. The exposed parts 557 of the first films are inserted into the insertion space 576*a* of the first conductor-receiving part 571*a* disposed in the first molding-receiving part 577*a*, and the exposed parts 558 of the second films are inserted into the insertion space 576*a* of the second conductor-receiving part 571*b* disposed in the second molding-receiving part 577*b*.

The insertion parts 555 are inserted into the insertion space 576*a* and are attached by the cover part 579.

The cover part 579 fills the molding space 576*b* in the state of being in contact with the films 540*a*. The electrode connection part 578 fills the molding space 576*b* in the state of being in contact with the insertion parts 555.

The cover part may include a pair of cover parts 579 disposed at opposite ends of the films 540*a* in the longitudinal direction Y. The cover parts 579 attach the opposite ends of the films 540*a* in the longitudinal direction Y.

The conductor-receiving part 571 is disposed in the molding space 576*b*. The insertion space 576*a*, which is defined in the molding space 576*b*, is filled with the electrode connection part 578. Each cover part 579 fills the molding space 576*b* while covering the electrode connection part 578. Each cover part 579 fills the molding space 576*b* while covering the electrode connection part 578 and the conductor-receiving part 571 (see FIGS. 22 to 24).

The molding-receiving part 577 has an opening of the molding space 576*b*. The insulative paste may be injected, and the insertion parts 555 may be inserted, through the opening of the molding space 576*b*. The conductor-receiving part 571 may be inserted, and the insulative paste may be injected, through the opening of the molding space 576*b*. The opening of the molding space 576*b* and the opening of the insertion space 576*a* may face the same direction.

The opening formed in the conductor-receiving part 571 may be formed at one side of the conductor-receiving part 571 in the lateral direction Z of the films. In this embodiment, the opening formed in the conductor-receiving part 571 is formed so as to face the electrification unit 510. One side of the conductor-receiving part 571 is opened and depressed to form the insertion space 576*a*.

The molding-receiving part 577 is disposed on at least one side of the films in the longitudinal direction Y. The molding-receiving part 577 extends in the direction X in which the films are arranged. The first molding-receiving part 577*a* is disposed on one side of the films in the longitudinal direction Y, and the second molding-receiving part 577*b* is disposed on the other side of the films in the longitudinal direction Y.

The molding-receiving part 577 includes a bottom surface 577-3 of the molding space 576*b*. The molding-receiving part 577 includes partition walls 577-2 that define opposite sides of the molding space 576*b* in the direction X in which the films are arranged. The molding-receiving part 577 includes partition walls 577-1 and 577-4 that define opposite sides of the molding space 576*b* in the longitudinal direction Y of the films.

The rear side of the bottom surface 573 of the conductor-receiving part 571 may be disposed on the bottom surface 577-3 of the molding-receiving part 577 while contacting the bottom surface 577-3.

The bottom surface 577-3 may be a plate that defines the outer surface of the case 501 and 502.

The molding-receiving part 577 may include holding ribs 572*b* inserted into the catching recesses 556 for positioning the films 540*a*. The first molding-receiving part 577*a* includes a first holding rib 572*b* configured to be inserted into a catching recess 556 formed in one end of each of the films 540*a* in the longitudinal direction Y, and the second molding-receiving part 577*b* includes a second holding rib 572*b* configured to be inserted into a catching recess 556 formed in the other end of each of the films 540*a* in the longitudinal direction Y.

The holding rib 572*b* may constitute one surface that partitions the molding space 576*b*. The holding rib 572*b* may constitute a portion of the molding-receiving part 577. In this embodiment, one of the partition walls 577-1 and 577-4 into which the catching recesses 556 are fitted, i.e. the partition wall 577-1, defines the holding rib 572*b*.

The other of the partition walls 577-1 and 577-4 opposite the holding rib 572*b*, i.e. the partition wall 577-4, may be a plate that defines the outer surface of the case 501 and 502.

The holding rib 572*b* may extend while connecting one end of one of the two partition walls 577-2 to a corresponding end of the other of the two partition walls 577-2. The partition wall 577-4 may extend while connecting the other end of one of the two partition walls 577-2 to the other end of the other of the two partition walls 577-2.

The holding ribs 572*a* of the conductor-receiving part 571 may contact the holding ribs 572*b* of the molding-receiving part 577. The holding ribs 572*a* and the holding ribs 572*b* may overlap each other. The holding ribs 572*a* and the holding ribs 572*b* may overlap each other and may be inserted into the respective catching recesses 556.

The molding-receiving part 577 may be provided at the inner surface thereof with a structure that is fastened to the fastening part 574*b* of the electrode connection part 578. The structure fastened to the fastening part 574*b* may be disposed at the bottom surface 577-3 of the molding-receiving part 577.

The partition wall 577-2 may be provided with a recess into which a conducting wire electrically connected to the electrode connection part 578 is inserted. The recess may be formed at the point of the partition wall 577-2 at which the partition wall 577-2 contacts the case 501 and 502. The conducting wire may be connected to the dust collection unit power-receiving terminal 548. The conducting wire may be connected to the dust collection unit ground-receiving terminal 549. The case 501 and 502 may further include a conducting wire location part 505, into which the conducting wire is inserted and attached. The conducting wire location part 505 may protrude from the inner surface of the case 501 and 502. The recess, into which the conducting wire is inserted, may be formed between the conducting wire location part 505 and the inner surface of the case 501 and 502.

Figure 22:
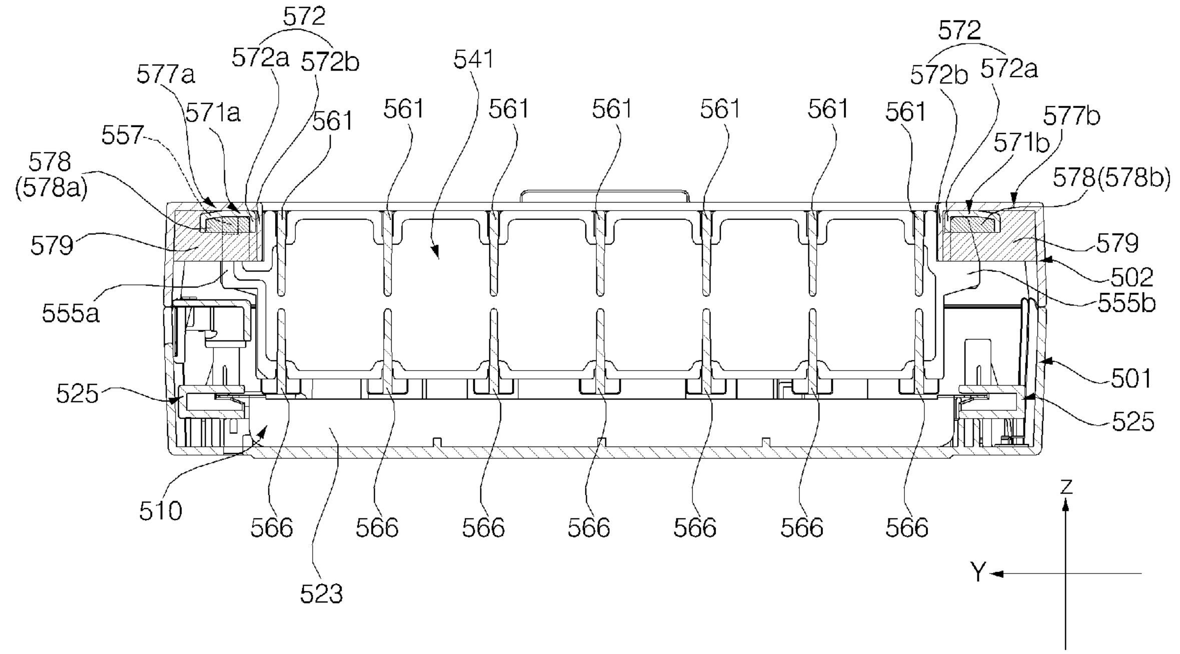
FIG. 22 is a sectional view taken along line A1-A1' of FIG. 21.
Figure 23:
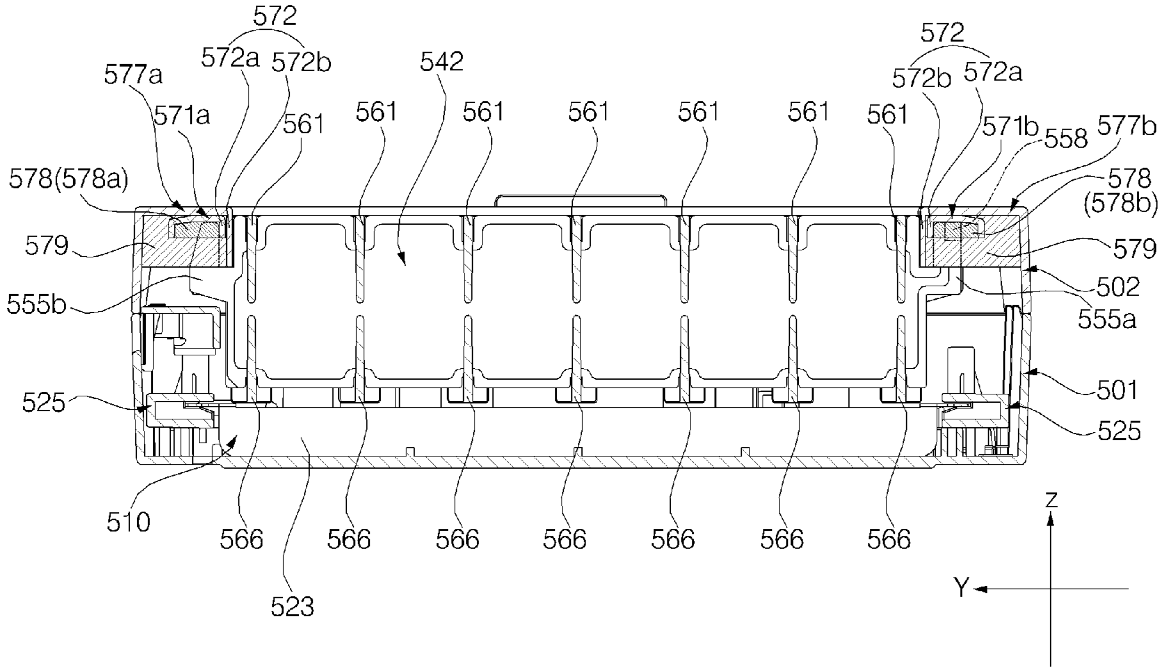
FIG. 23 is a sectional view taken along line A2-A2' of FIG. 21.
Figure 24:
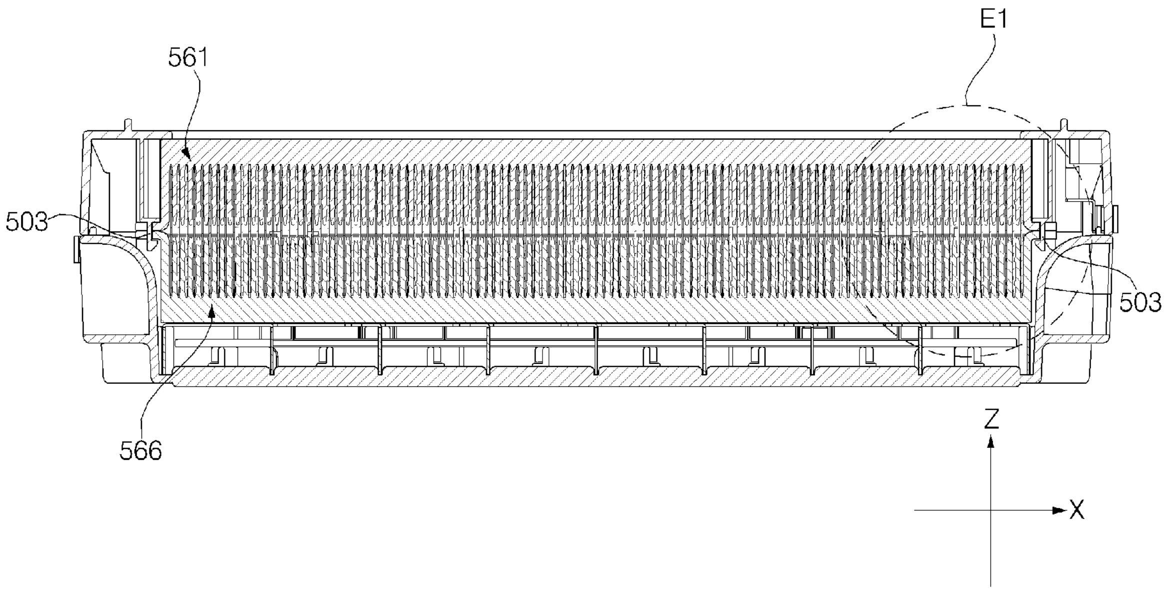
FIG. 24 is a sectional view taken along line B-B' of FIG. 21.

Referring to FIGS. 21 to 23, the predetermined paste, which will constitute the molding parts 578 and 579, fills the insertion space 576*a* and the molding space 576*b*, and is hardened to attach the insertion parts 555. The insertion parts 555 protrude while having a smaller area or width than the films 540*a*, whereby the molding parts 578 and 579 efficiently attach the films 540*a*.

The electrode connection part 578 attaches the films 540*a* as the result of hardening the paste in the state in which the exposed parts 557 and 558 are immersed in the conductive paste. The electrode connection part 578 is electrically connected to the voltage source to apply voltage to the conductive layers of the films 540*a*. The electrode connection part 578 electrically interconnects the films 540*a*.

The electrode connection part 578 includes a first electrode connection part 578*a* constituting the portion of the first conducting wire 584 contacting the films 540*a* and a second electrode connection part 578*b* constituting the portion of the second conducting wire 583 contacting the films 540*a*.

The first electrode connection part 578*a* electrically interconnects the first films 541. The second electrode connection part 578*b* electrically interconnects the second films 542. The opposite ends of the first films 541 and the second films 542 are attached to the first electrode connection part 578*a* and the second electrode connection part 578*b*.

The exposed part 557 is formed at one end of each of the first films 541 in the longitudinal direction Y, and the exposed part 558 is formed at the other end of each of the second films 542 in the longitudinal direction Y. The first electrode connection part 578*a* is formed at one end of each of the first films 541 in the longitudinal direction Y so as to extend in the direction X in which the films are arranged, and the second electrode connection part 578*b* is formed at the other end of each of the second films 542 in the longitudinal direction Y so as to extend in the direction X in which the films are arranged.

The first electrode connection part 578*a* electrically interconnects the exposed parts 557 of the first films 541, and the second electrode connection part 578*b* electrically interconnects the exposed parts 558 of the second films 542. That is, the first electrode connection part 578*a* electrically interconnects all of the high-potential connection parts 557, and the second electrode connection part 578*b* electrically interconnects all of the low-potential connection parts 558.

The exposed part 557 of each of the first films 541, which is not covered by the insulative layer 552*a* of the conductive layer 551*a*, constitutes a high-potential connection part 557. The high-potential connection part 557 contacts the first conducting wire 584. That is, the high-potential connection part 557 contacts the first electrode connection part 578*a*, which constitutes a portion of the first conducting wire 584. High potential is applied to the conductive layer 551*a* of each of the first films 541 via the high-potential connection part 557.

The exposed part 558 of each of the second films 542, which is not covered by the insulative layer 552*b* of the conductive layer 551*b*, constitutes a low-potential connection part 558. The low-potential connection part 558 contacts the second conducting wire 583. That is, the low-potential connection part 558 contacts the second electrode connection part 578*b*, which constitutes a portion of the second conducting wire 583. Low potential is applied to the conductive layer 551*b* of each of the second films 542 via the low-potential connection part 558.

The exposed parts 557 and 558 are at least partially inserted into the insertion space 576*a* so as to contact the electrode connection part 578. Only portions of the exposed parts 557 and 558 are inserted into the insertion space 576*a* such that the portions of the exposed parts 557 and 558 are covered by the electrode connection part 578 and the remainders of the exposed parts 557 and 558 are covered by the cover part 579. In other embodiments, the exposed parts 557 and 558 are entirely inserted into the insertion space 576*a* such that the exposed parts 557 and 558 are covered only by the electrode connection part 578. That is, the exposed parts 557 and 558 may be covered by both the electrode connection part 578 and the cover part 579 or by only the electrode connection part 578.

The electrode connection part 578 attaches the exposed parts 557 and 558. The cover part 579 may attach the exposed parts 557 and 558 together with the electrode connection part 578. The electrode connection part 578 attaches the insertion parts 555.

The first electrode connection part 578*a* attaches an insertion part 555 formed at one end of each of the first films 541 and the second films 542 in the longitudinal direction Y while being integrally coupled thereto. The second electrode connection part 578*b* attaches an insertion part 555 formed at the other end of each of the first films 541 and the second films 542 in the longitudinal direction Y while being integrally coupled thereto.

The first electrode connection part 578*a* attaches the insertion parts 555*a* of the first films 541 having the high-potential connection parts 557 and the insertion parts 555*b* of the second films 542 having no low-potential connection parts 558. The second electrode connection part 578*b* attaches the insertion parts 555*b* of the first films 541 having no high-potential connection part 557 and the insertion parts 555*a* of the second films 542 having the low-potential connection part 558. As a result, the first electrode connection part 578*a* may apply relatively high potential only to the conductive layers 551*a* of the first films, and the second electrode connection part 578*b* may apply relatively low potential only to the conductive layers 551*b* of the second films.

The electrode connection part 578 is formed by hardening the conductive paste. As a result, the electrode connection part 578 is joined to the high-potential connection parts 557 and the low-potential connection parts 558 while being in tight contact therewith so as to firmly attach the insertion parts 555, thereby minimizing contact resistance. In addition, the contact of air with the high-potential connection parts 557 and the low-potential connection parts 558 is prevented, thereby preventing the occurrence of sparks.

The conductive paste may be formed by mixing conductive powder, an organic solvent, and macromolecule resin. The conductive paste is in a semi-solid state before hardening and is in a solid state after hardening.

The conductive powder is obtained by pulverizing conductive solid material into small particles. The conductive solid material may be a metal, such as carbon, copper, or silver. In this embodiment, the conductive powder is a carbon black powder.

The organic solvent is liquid at room temperature. When the organic solvent mixed with the conductive powder is evaporated according to predetermined drying conditions, the conductive powder is hardened to form a solid.

The macromolecule resin is provided in the form of powder. The conductive powder and the macromolecule resin remain unchanged even after the conductive paste is hardened. The conductive powder and the macromolecule resin are mixed with each other but are not chemically coupled to each other. After the conductive paste is hardened, the particles of the conductive powder are connected to each other. As a result, the hardened conductive paste may exhibit electrical conductivity.

The electrode connection part 578 is formed as the result of combination of the conductive paste. The electrode connection part 578 may be formed as the result of combining the macromolecule resin powder with the conductive paste.

The conductive paste may include about 30% of conductive powder, about 50% of an organic solvent, and about 20% of macromolecule resin. However, the present invention is not limited thereto.

The conductive powder may include conductive coating powder obtained by coating powder exhibiting relatively low electrical conductivity with a metal exhibiting relatively high electrical conductivity. In this embodiment, the conductive coating powder is obtained by coating copper powder, which exhibits relatively low electrical conductivity, with silver, which exhibits relatively high electrical conductivity. In this embodiment, the conductive powder is carbon powder.

The conductive powder may be obtained by mixing general conductive powder, which is not coated with a metal, with the conductive coating powder. The composition ratio of the general conductive powder to the conductive coating powder may be adjusted based on the desired resistance value of the electrode connection part 578. When the conductive coating powder is added, it is possible to efficiently reduce the resistance value of the electrode connection part 578.

The electrode connection part 578 is watertightly covered by the cover part 579. The cover part 579 is made of a waterproof material. The cover part 579 is molded on the surface of the electrode connection part 578 that is exposed to external air. The cover part 579 may include epoxy resin or urethane resin. However, the present invention is not limited thereto. The material for the cover part 579 is not particularly restricted as long as the material can be hardened.

The cover part 579 may be formed by mixing the main material with a hardening agent. The main material may include bisphenol A-type epoxy resin, a non-flammable filler, and other additives. The hardening agent may be aliphatic amine modified hardener.

The cover part 579 may be applied to the surface of the electrode connection part 578 exposed through the opening of the conductor-receiving part 571. In the state in which the electrode connection part 578 fills the insertion space 576*a*, the cover part 579 is disposed so as to cover the surface of the electrode connection part 578 that is exposed to external air. The electrode connection part 578 is disposed so as to be covered by the conductor-receiving part 571 and the cover part 579.

Referring to FIGS. 21 to 20, the fixing part 540*b* includes a pair of gap maintenance parts 560 disposed on opposite sides of the group of films 540*a* in the lateral direction Z for maintaining the gap S.

Each of the gap maintenance parts 560 may include a base gap maintenance part 561, disposed at one side of the group of films 540*a* in the lateral direction Z, and a roof gap maintenance part 566, disposed at the other side of the group of films 540*a* in the lateral direction Z.

Each gap maintenance part 560 includes a plurality of vertical bars 568 configured to be inserted into the gaps S from one side of the group of films 540*a* in the lateral direction Z. The base gap maintenance part 561 includes a plurality of first vertical bars 568-1 configured to be inserted into the gaps S from one side of the group of films 540*a*. The roof gap maintenance part 566 includes a plurality of second vertical bars 568-2 configured to be inserted into the gaps S from the other side of the group of films 540*a*.

The vertical bars 568 may be inserted up to the middle portions of the films 540*a* in the lateral direction Z. The first vertical bars 568-1 may be inserted up to the middle portions of the films 540*a* in the lateral direction Z. The second vertical bars 568-2 may be inserted up to the middle portions of the films 540*a* in the lateral direction Z.

Figure 25:
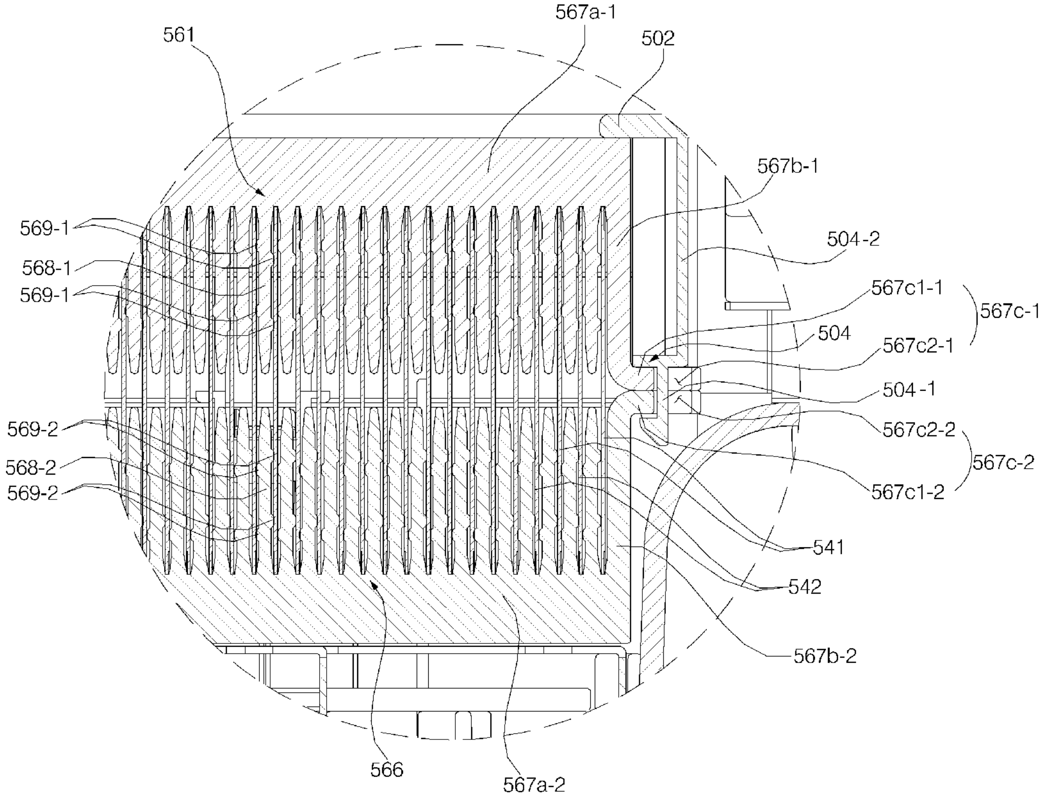
FIG. 25 is an enlarged view showing a dotted-line part of FIG. 24.
Figure 26:
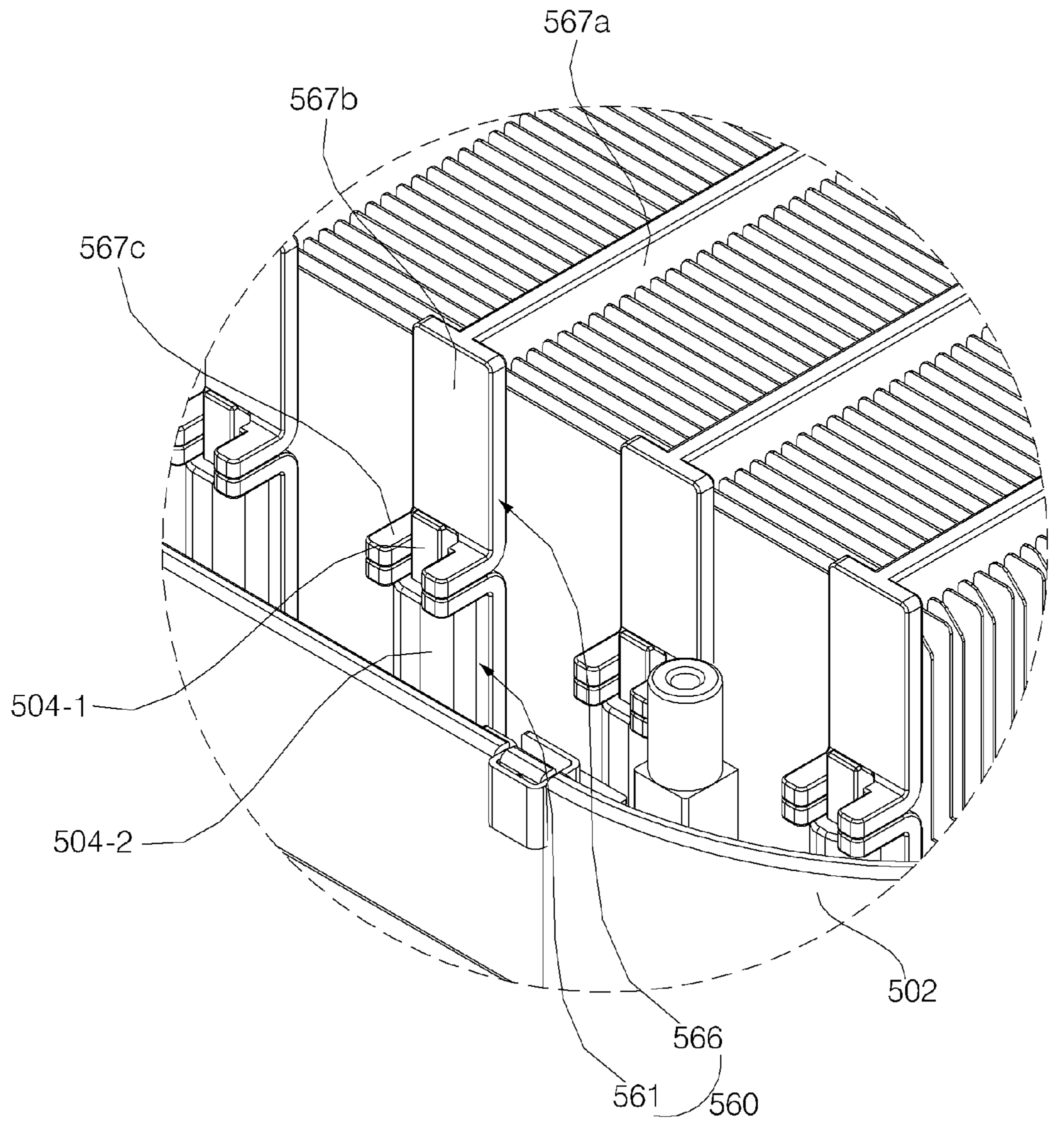
FIG. 26 is an enlarged view showing a dotted-line part of FIG. 13.
Figure 27:
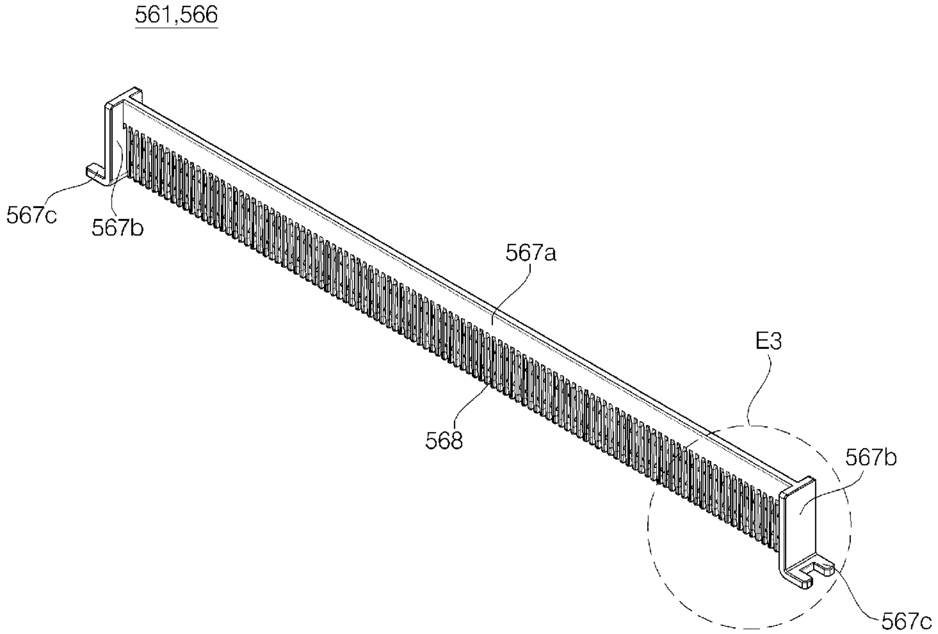
FIG. 27 is a perspective view showing gap maintenance parts of FIG. 13.
Figure 28:
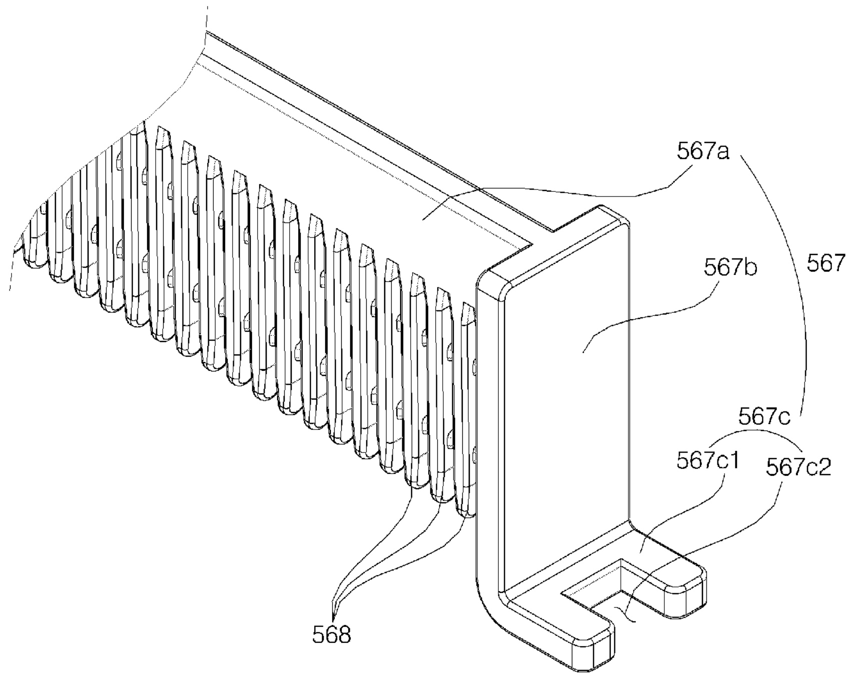
FIG. 28 is an enlarged view showing a dotted-line part of FIG. 27.
Figure 29:
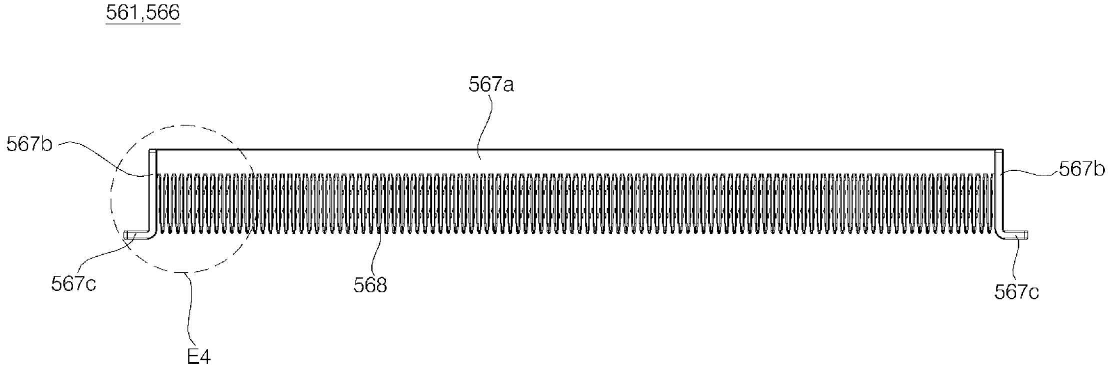
FIG. 29 is an elevation view showing the gap maintenance parts of FIG. 27.
Figure 30:
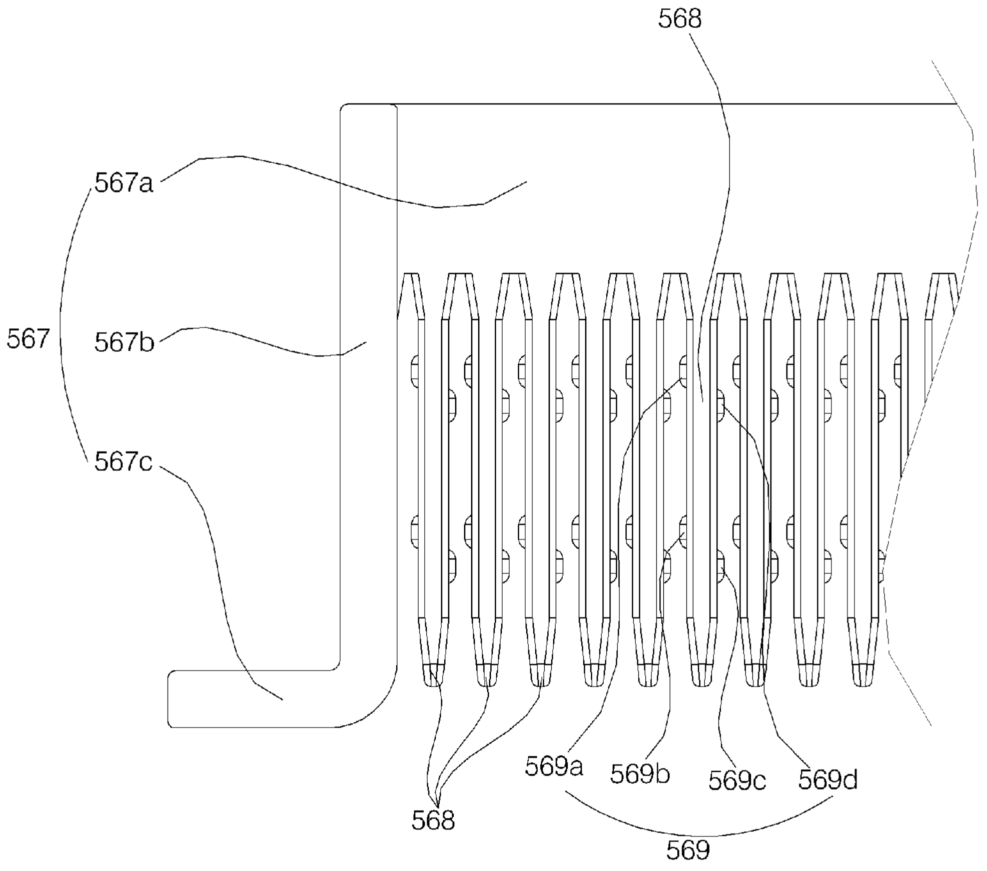
FIG. 30 is an enlarged view showing a dotted-line part of FIG. 29.

The base gap maintenance part 561 and the roof gap maintenance part 566 may be arranged so as to be symmetric with respect to the lateral middle portion of the group of films 540*a*. Referring to FIG. 25, the opposite ends of the first films 541 and the second films 542 in the lateral direction Z may contact the base gap maintenance part 561 and the roof gap maintenance part 566.

The base gap maintenance part 561 and the roof gap maintenance part 566 may have the same shape. Hereinafter, the base gap maintenance part 561 and the roof gap maintenance part 566 will be described as having the same shape. FIGS. 27 to 30 show the structure of the base gap maintenance part 561 and the roof gap maintenance part 566. However, the present invention is not limited thereto.

Protrusions 569 protruding toward the surfaces of the films 540*a* to reduce the gaps between the films 540*a* may be formed on the vertical bars 568. Protrusions 569 protruding toward the surfaces of the films 540*a* to reduce the gaps between the films 540*a* may be formed on the first vertical bars 568-1 and the second vertical bars 568-2. First protrusions 569-1 are formed on the first vertical bars 568-1, and second protrusions 569-2 are formed on the second vertical bars 568-2.

A plurality of protrusions 569*a* and 569*b* protruding in one direction may be formed on each of the vertical bars 568 in the state of being spaced apart from each other. In addition, a plurality of protrusions 569*c* and 569*d* protruding in the other direction may be formed on each of the vertical bars 568 in the state of being spaced apart from each other. The protrusions 569*a* and 569*d*, which protrude in opposite directions, may be disposed so as not to be aligned in the vertical direction Z. In addition, the protrusions 569*b* and 569*c*, which protrude in opposite directions, may be disposed so as not to be aligned in the vertical direction Z.

A plurality of gap maintenance parts 560 may be arranged at intervals in the longitudinal direction Y of the films 540*a*.

The gap maintenance part 560 includes a gap maintenance body 567 for covering the opposite ends of the group of films in the direction X in which the films are arranged and one side of the group of films in the lateral direction Z. The gap maintenance body 567 supports the proximal ends of vertical bars 568.

The base gap maintenance part 561 may include a first gap maintenance body 567 for covering the opposite ends of the group of films in the direction X in which the films are arranged and one side of the group of films in the lateral direction Z and supporting the proximal ends of the first vertical bars 568-1. The roof gap maintenance part 566 may include a second gap maintenance body 567 for covering the opposite ends of the group of films in the direction X in which the films are arranged and the other side of the group of films in the lateral direction Z and supporting the proximal ends of the second vertical bars 568-2.

The gap maintenance body 567 may include opposite end support parts 567*b* disposed at the opposite ends of the group of films in the direction X in which the films are arranged and coupled to the dust collection unit case 502, a horizontal bar 567*a* extending in the direction X in which the films are arranged while contacting the group of films, and fastening parts 567*c* for attaching the gap maintenance part 560 to the dust collection unit case 502.

Referring to FIG. 25, the first gap maintenance body 567 may include first opposite end support parts 567*b*-1 disposed at opposite ends of the group of films in the direction X in which the films are arranged and coupled to the dust collection unit case 502, a first horizontal bar 567*a*-1 extending in the direction X in which the films are arranged while contacting the group of films, and first fastening parts 567*c*-1 for attaching the base gap maintenance part 561 to the dust collection unit case 502.

Referring to FIG. 25, the second gap maintenance body 567 may include second opposite end support parts 567*b*-2 disposed at the opposite ends of the group of films in the direction X in which the films are arranged and coupled to the dust collection unit case 502, a second horizontal bar 567*a*-2 extending in the direction X in which the films are arranged while contacting the group of films, and second fastening parts 567*c*-2 for attaching the roof gap maintenance part 562 to the dust collection unit case 502.

The dust collection unit case 502 includes hook members 504. Each hook member 504 includes a hook 504-1 and a hook fixing part 504-2. The hook members 504 protrude from the inner surface of the dust collection unit case 502.

The dust collection unit case 502 includes hooks 504-1, on which the first fastening parts 567*c*-1 and the second fastening parts 567*c*-2 are caught in the state in which the first fastening parts 567*c*-1 and the second fastening parts 567*c*-2 contact each other. One of the first fastening parts 567*c*-1 and a corresponding one of the second fastening parts 567*c*-2 are caught on a corresponding hook 504-1 in the state in which the first fastening part 567*c*-1 and the second fastening part 567*c*-2 contact each other.

Each fastening part 567*c* includes a fastening plate 567*c*1 configured to contact another fastening part 567*c*. The fastening plate 567*c*1 is provided with a hook recess 567*c*2, into which a corresponding hook 504-1 is inserted and caught.

Each first fastening part 567*c*-1 includes a first fastening plate 567*c*1-1 configured to contact a corresponding second fastening part 567*c*-2. The first fastening plate 567*c*1-1 is provided with a hook recess 567*c*2-1, into which a corresponding hook 504-1 is inserted and caught.

Each second fastening part 567*c*-2 includes a second fastening plate 567*c*1-2 configured to contact a corresponding first fastening part 567*c*-1. The second fastening plate 567*c*1-2 is provided with a hook recess 567*c*2-2, into which a corresponding hook 504-1 is inserted and caught.

The dust collection unit case 502 includes hook fixing parts 504-2 for supporting and attaching the hooks 504-1. One end of each of the hook fixing parts 504-2 is attached to the dust collection unit case 502, and the other end of each of the hook fixing parts 504-2 protrudes up to the middle portion of the group of films 540*a* in the lateral direction Z so as to be connected to a corresponding hook 504-1.

The dust collection unit case 502 includes fixing plates (not shown) having steps for supporting the fastening parts 567*c* between the hooks 504-1 and the hook fixing parts 504-2 while contacting the fastening parts 567*c*. In this embodiment, each of the fixing plates has a step that contacts the first fastening part 567*c*-1, as shown in FIG. 25.

Figure 15:
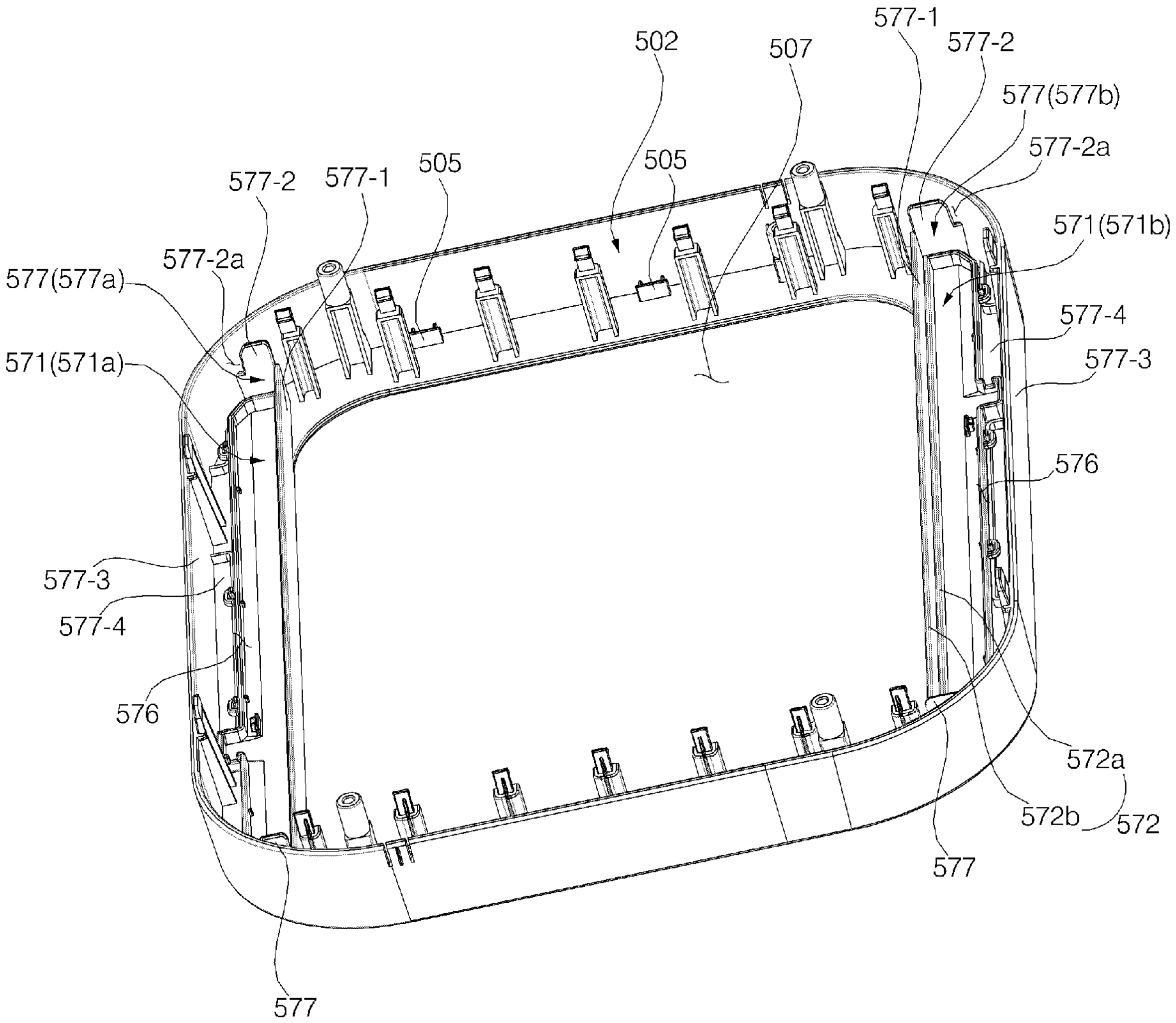
FIG. 15 is a perspective view showing the dust collection unit of FIG. 12, excluding the dust collection unit case.
Figure 16:
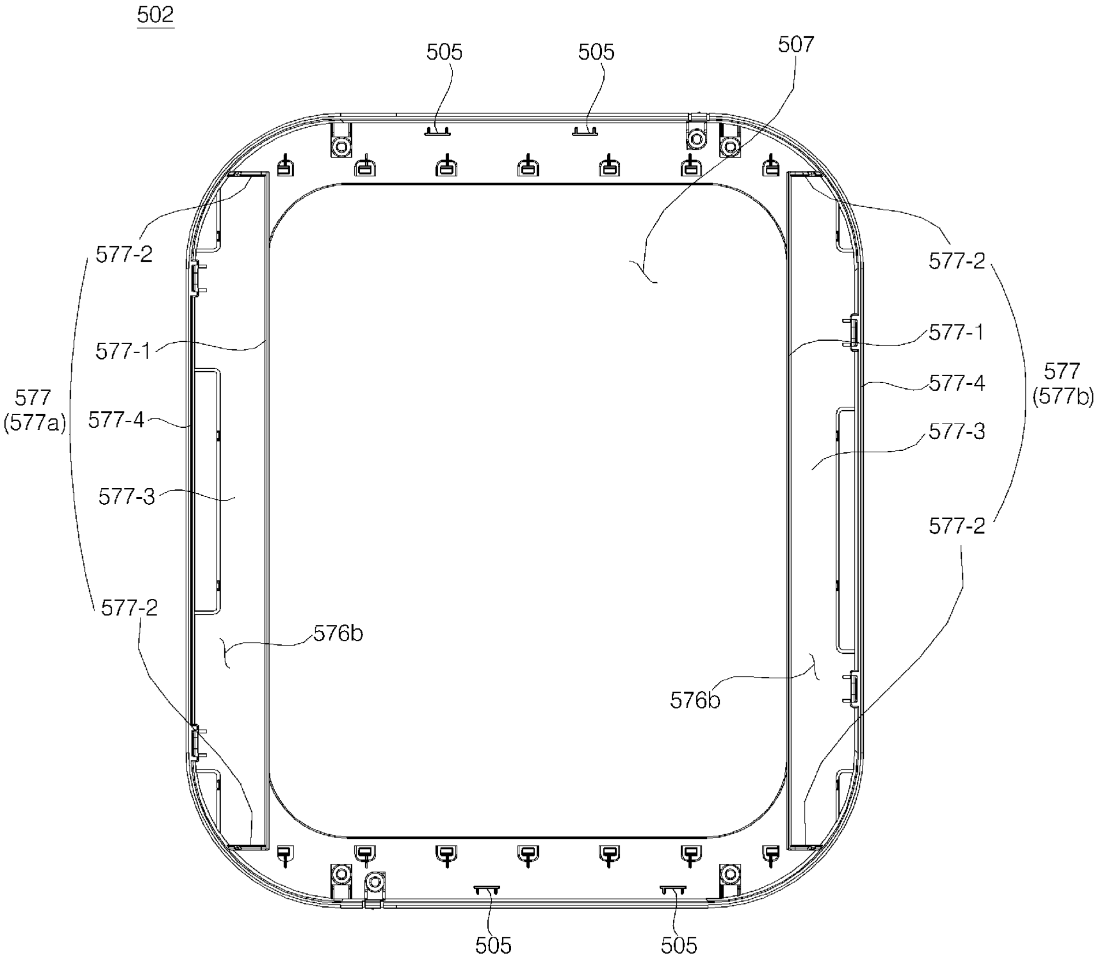
FIG. 16 is an elevation view showing the dust collection unit case of FIG. 15, excluding the conductor-receiving part.
Figure 17:
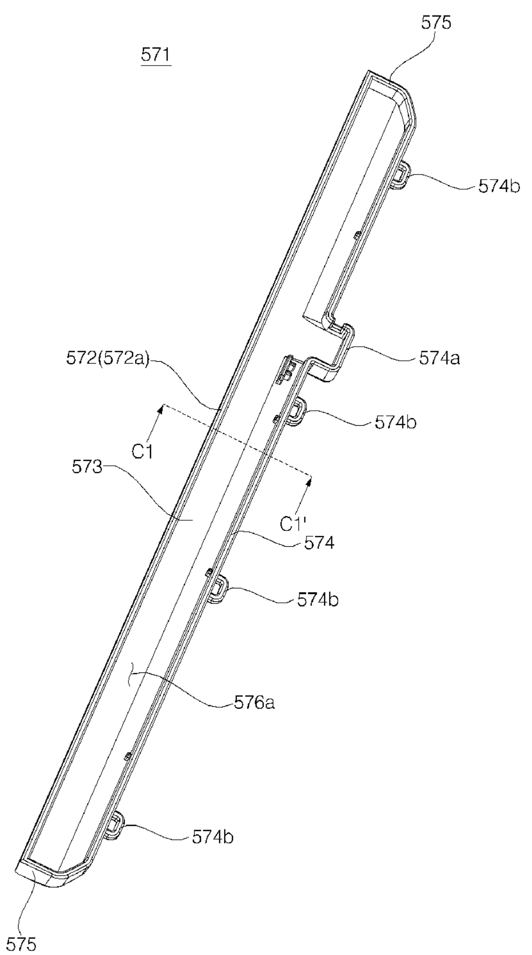
FIG. 17 is a perspective view showing the conductor-receiving part of FIG. 15.
Figure 18:
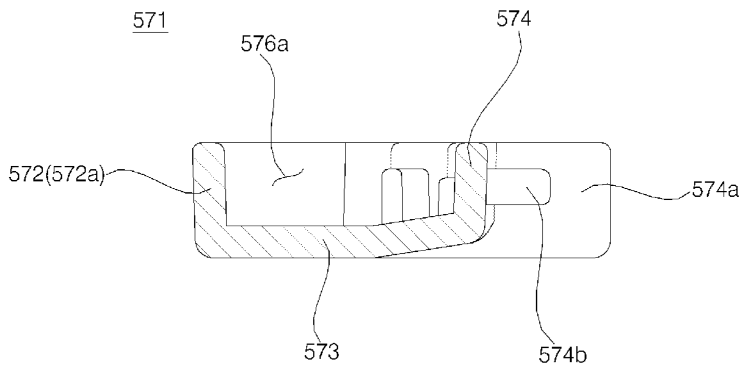
FIG. 18 is a sectional view taken along line C1-C1' of FIG. 17.

Hereinafter, a method of manufacturing the electric dust collector using the conductive paste will be described with reference to FIGS. 12, 13, and 15.

The method of manufacturing the electric dust collector includes (a) disposing the films 540*a* at predetermined positions, (b) injecting the conductive paste such that the exposed parts 557 and 558 are immersed in the conductive paste, (c) hardening the injected conductive paste according to predetermined drying conditions, (d) applying the insulative paste to the surface of the hardened conductive paste that is exposed to external air, and (e) hardening the applied insulative paste according to predetermined drying conditions.

At step (a), a step of disposing the surface of the dust collection unit case 502 having the outlet port 507 so as to contact the floor such that the inner space of the dust collection unit case 502 faces upward is performed.

Subsequently, a step of disposing the base gap maintenance parts 561 at predetermined positions in the dust collection unit case 502 such that the base vertical bars 564 protrude upward is performed. The base gap maintenance parts 561 are fastened to the dust collection unit case 502.

Subsequently, a step of inserting the holding ribs 572 into the catching recesses 556 of the films 540*a* and inserting the films 540*a* between the respective base vertical bars 564 of the base gap maintenance parts 561 such that the films 540*a* are disposed at the predetermined positions is performed. When the films 540*a* are disposed at the predetermined positions, the tips of the insertion parts 555 are inserted into the insertion space 576*a*.

Subsequently, a step of disposing the roof gap maintenance parts 566 at predetermined positions in the dust collection unit case 502 such that the films 540*a* are inserted between the respective roof gap maintenance parts 566 is performed. The roof gap maintenance parts 566 are fastened to the dust collection unit case 502. The base gap maintenance parts 561 and the roof gap maintenance parts 566 are fastened to the dust collection unit case 502.

The step of disposing the roof gap maintenance parts may be performed during or after step (b) or step (c). However, the step of disposing the roof gap maintenance parts may be performed before step (b) such that the films 540*a* can be more accurately disposed before the conductive paste is injected.

Subsequently, step (b) is performed. At step (b), the conductive paste is injected into the insertion space 576*a* such that the tips of the insertion parts 555 are immersed in the conductive paste. That is, the conductive paste is injected into the insertion space 576*a* such that the exposed parts 557 and 558 can be entirely immersed in the conductive paste.

Subsequently, step (c) is performed. At step (c), the injected conductive paste is hardened according to the predetermined drying conditions, i.e. conductive paste drying temperature and conductive paste drying time. The conductive paste drying temperature and the conductive paste drying time may be changed depending on the composition and mixing ratio of the conductive paste. The conductive paste drying temperature may be 75° C. or less and the conductive paste drying time may be 180 minutes or less in order to prevent deformation of the films 540*a*.

Subsequently, step (d) is performed. The insulative paste is injected into the molding space 576*b* so as to cover the surface of the hardened conductive paste that is exposed to external air.

Subsequently, step (e) is performed. At step (e), the injected insulative paste is hardened according to the predetermined drying conditions, i.e. insulative paste drying temperature and insulative paste drying time. The insulative paste drying temperature and the insulative paste drying time may be changed depending on the composition and mixing ratio of the waterproof material. In this embodiment, the insulative paste drying temperature is 60° C. or less, and the insulative paste drying time is 180 minutes or less.

As is apparent from the above description, according to the present invention, the conductive layers of the films are securely joined to the electrode connection part such that the jointed portions are not exposed to external air, whereby it is possible to minimize the likelihood of the occurrence of sparks. Specifically, experiments show that no sparks occur even when a voltage of up to 24 kV is applied.

The conductive layers of the films are isolated from external air and moisture by the insulative layers. In addition, the exposed parts of the films are isolated from external air and moisture by the electrode connection part or the insulative cover part. In addition, the electrode connection part is isolated from external air and moisture by the insulative cover part. Even when a user powers on the electric dust collector after washing the electric dust collector with water, therefore, it is possible to stably generate an electric field in the dust collection unit without the risk of an electric shock or a short circuit.

The conductive layers of the films are joined to the electrode connection part all at the same time, whereby the manufacturing process is conveniently and accurately performed.

In addition, the holding ribs and holding recesses are provided to hold the films before the conductive paste is hardened, whereby the manufacturing process is conveniently and accurately performed. Furthermore, it is possible to more securely attach the films.

Effects of the present invention are not limited to the aforementioned effects, and other unmentioned effects will be clearly understood by those skilled in the art from the claims.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electric dust collector comprising:

a film to collect electrified dust particles; and a case receiving the film, wherein the film comprises a conductive layer, to which voltage is applied, and an insulative layer covering the conductive layer, portion of the conductive layer exposed to form an exposed part, wherein the film comprises an insertion part extending from each of opposite ends thereof, wherein the exposed part is formed at the insertion parts, wherein a molding-receiving part defining a molding space into which the insertion parts are inserted, and a conductor-receiving part defining an insertion space into which the insertion parts are inserted, are provided in the case, and the electric dust collector further comprises an electrode connection part filling the insertion space in contact with the film, the electrode connection part electrically connected to a voltage source to apply voltage to the film, and an electrically insulative cover part filling the molding space in contact with the film while covering the electrode connection part.

2. The electric dust collector according to claim 1, wherein the electrode connection part is formed by hardening conductive paste.

3. The electric dust collector according to claim 2, wherein the conductive paste comprises a mixture of conductive powder, an organic solvent, and macromolecule resin.

4. The electric dust collector according to claim 1, wherein the electrode connection part is formed by combining conductive powder.

5. The electric dust collector according to claim 1, wherein the film comprises a plurality of films arranged to face each other such that gaps are formed between the respective films, and the electric dust collector further comprises a gap maintenance part having vertical bars inserted into the gaps to maintain the gaps.

6. The electric dust collector according to claim 1, wherein at least a portion of the exposed part is inserted into the insertion space to contact the electrode connection part.

7. The electric dust collector according to claim 1, wherein the conductor-receiving part and the exposed part are disposed in the molding space.

8. The electric dust collector according to claim 1, wherein the film is provided with a catching recess, and the molding-receiving part comprises a holding rib inserted into the catching recess to position the film.

9. The electric dust collector according to claim 6, wherein the electrode connection part fixes the exposed part.

10. The electric dust collector according to claim 1, wherein the film is provided with a catching recess, and the conductor-receiving part comprises a holding rib inserted into the catching recess so as to position the film.

11. The electric dust collector according to claim 1, further comprising a metal member disposed on a bottom surface of the conductor receiving part, and covered by the electrode connection part, a conducting wire electrically connected to the voltage source fixed to the metal member.

12. The electric dust collector according to claim 1, wherein the film comprises a plurality of films arranged to face each other such that a gap is formed between the respective films, wherein each of plurality of the films comprises the insertion parts extending from opposite ends thereof, in the longitudinal direction Y and bent in the lateral direction Z, and a catching recess formed in at least one end thereof in the longitudinal direction Y so as to be depressed in the lateral direction Z, wherein the conductor-receiving part comprises a conductor-receiving part holding rib inserted into the catching recess to position the film, wherein the molding-receiving part comprises a molding-receiving part holding rib inserted into the catching recesses to position the film, wherein the conductor-receiving part holding rib and the molding-receiving part holding rib overlap each other and inserted into the respective catching recesses, wherein the conductor receiving part holding rib comprises a first conductor receiving part holding rib inserted into a catching recess formed at a first end of each of the films and a second conductor receiving part holding rib inserted into a catching recess formed at a second end of each of the films, and wherein the molding-receiving part holding rib comprises a first molding-receiving part holding rib inserted into a catching recess formed at the first end of each of the films and a second molding-receiving part holding rib inserted into a catching recess formed at the second end of each of the films.

13. The electric dust collector according to claim 1, wherein the film comprises a plurality of films, and the electrode connection part electrically interconnects the films.

14. The electric dust collector according to claim 1, wherein the film comprises a plurality of first films, and a plurality of second films to which a low potential is applied as compared to the plurality of first films, the electrode connection part comprises a first electrode connection part to electrically interconnect the first films and a second electrode connection part to electrically interconnect the second films, and the conductor-receiving part comprises a first conductor-receiving part defining a space filled with the first electrode connection part and a second conductor-receiving part defining a space filled with the second electrode connection part.

15. The electric dust collector according to claim 14, wherein each of the first films and the second films includes a conductive layer, to which voltage is applied, and an insulative layer covering the conductive layer, a portion of the conductive layer exposed to form an exposed part, the exposed part of each of the first films is formed at a first end of the first film in a longitudinal direction, the exposed part of each of the second films is formed at a second end of the second film in the longitudinal direction, and opposite ends of the first films and the second films are fixed respectively to the first electrode connection part and the second electrode connection part.

16. A method of manufacturing the electric dust collector according to claim 2, the method comprising:

disposing the film at a predetermined position;

injecting the conductive paste such that a portion of the film is immersed in the conductive paste; and hardening the injected conductive paste.

* * * * *